(12) United States Patent
Lim et al.

(10) Patent No.: US 9,560,377 B2
(45) Date of Patent: Jan. 31, 2017

(54) HIERARCHICAL MOTION ESTIMATION METHOD AND APPARATUS BASED ON ADAPTIVE SAMPLING

(71) Applicant: SAMSUNG ELECTRONICS CO., LTD., Suwon-si (KR)

(72) Inventors: Hyung-jun Lim, Suwon-si (KR); Tae-gyoung Ahn, Yongin-si (KR); Yong-hoon Yu, Seoul (KR); Seong-hoon Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 287 days.

(21) Appl. No.: 14/336,367

(22) Filed: Jul. 21, 2014

(65) Prior Publication Data

US 2015/0023424 A1    Jan. 22, 2015

(30) Foreign Application Priority Data

Jul. 19, 2013 (KR) .......................... 10-2013-0085688

(51) Int. Cl.
*H04N 19/00* (2014.01)
*H04N 19/53* (2014.01)
*H04N 19/52* (2014.01)

(52) U.S. Cl.
CPC ............. *H04N 19/53* (2014.11); *H04N 19/52* (2014.11)

(58) Field of Classification Search
CPC .................................................... H04N 19/53

USPC ........................................ 375/240.16, 240.21
See application file for complete search history.

(56) References Cited

U.S. PATENT DOCUMENTS

| | | | |
|---|---|---|---|
| 5,610,658 A | 3/1997 | Uchida et al. | |
| 6,128,341 A * | 10/2000 | Kwak | H04N 19/59 375/240 |
| 6,148,027 A | 11/2000 | Song et al. | |
| 6,343,099 B1 | 1/2002 | Ogura | |
| 8,442,108 B2 | 5/2013 | Song et al. | |
| 8,472,527 B2 | 6/2013 | Madumbu et al. | |
| 2005/0123039 A1* | 6/2005 | Song | H04N 19/56 375/240.11 |
| 2008/0260033 A1* | 10/2008 | Austerlitz | H04N 19/56 375/240.16 |
| 2009/0226105 A1 | 9/2009 | Huang | |
| 2012/0224786 A1 | 9/2012 | Heng et al. | |

OTHER PUBLICATIONS

Communication dated Nov. 3, 2014 issued by International Searching Authority in counterpart International Patent Application No. PCT/KR2014/006617.

(Continued)

*Primary Examiner* — Jeffrey Williams
(74) *Attorney, Agent, or Firm* — Sughrue Mion, PLLC

(57) ABSTRACT

A hierarchical motion prediction apparatus and method. The hierarchical motion prediction method splits a current frame and a reference frame into pixel groups, changes a pixel location of each pixel group, and selects one pixel, and thus resolutions of the current frame and reference frame are reduced. A motion vector of a down-sampled current block is obtained based on a down-sampled current frame and reference frame, and is expanded to a motion vector of an original resolution based on a down sampling rate.

23 Claims, 16 Drawing Sheets

(56) References Cited

OTHER PUBLICATIONS

Communication dated Dec. 5, 2016 issued by the European Patent Office in counterpart European Patent Application No. 14826655.4.
Jindal et al.; "Adaptive Block Sub-Sampling Algorithm for Motion-Estimation on SIMD Processors"; 2004 International Conference on Image Processing (ICIP); vol. 3; Oct. 2004; XP010786027; 4 pages total.
Cheng et al.; "A Vario-Power ME Architecture Using Content-Based Subsample Algorithm"; IEEE Transactions on Consumer Electronics; vol. 50; No. 1; Feb. 2004; XP001198150; 6 pages total.
Lim et al.; "An Hierarchical Motion Estimation Method Using Adaptive Image Down-sizing"; IEEE International Conference on Consumer Electronics (ICCE); Jan. 2014; XP032582015; 2 pages total.

* cited by examiner

PARTITION TYPE (800)

PREDICTION MODE (810)

SIZE OF TRANSFORMATION UNIT (820)

CODING UNIT (1010)

PREDICTION UNIT (1060)

X : SAMPLING LOCATION

X : SAMPLING LOCATION

O : SAMPLING LOCATION

HIERARCHICAL MOTION ESTIMATION METHOD AND APPARATUS BASED ON ADAPTIVE SAMPLING

CROSS-REFERENCE TO RELATED APPLICATION

This application claims the benefit of Korean Patent Application No. 10-2013-0085688, filed on Jul. 19, 2013, in the Korean Intellectual Property Office, the disclosure of which is incorporated herein in its entirety by reference.

BACKGROUND

1. Field

One or more exemplary embodiments relate to motion estimation of a video image, and more particularly, to hierarchical motion estimation performed on a reduced image.

2. Description of the Related Art

In general, image compressing methods, such as Moving Picture Experts Group (MPEG)-1, MPEG-2, MPEG-4 Visual, H.261, H.263, and H.264/MPEG-4 advanced video coding (AVC), compress image data by splitting a frame into a plurality of macro blocks, performing prediction on the macro blocks, obtaining prediction blocks, and converting and quantizing differences between an original image block and the prediction blocks.

There are two types of prediction methods; inter prediction and intra prediction. The intra prediction performs prediction on a current block by using data of peripheral blocks present in a current frame. The inter prediction performs block based motion prediction and generates a prediction block corresponding to a current block from previously encoded one or more video frames.

SUMMARY

One or more exemplary embodiments include a hierarchical motion estimation method performed by reducing an image. In particular, when the image is reduced so as to perform motion estimation, correlations between frames of the reduced image are improved, and thus motion prediction efficiency is improved even when the reduced image is used.

Additional aspects will be set forth in part in the description which follows and, in part, will be apparent from the description, or may be learned by practice of the presented exemplary embodiments.

According to one or more exemplary embodiments, a hierarchical motion prediction method includes: splitting a first frame including a block that is to be motion-predicted into first pixel groups, and generating a down-sampled block and a down-sampled first frame of the block that is to be motion-predicted by selecting a pixel of a first location from each of the split first pixel groups; splitting a second frame that is encoded and then reconstructed into second pixel groups for motion prediction of the down-sampled block, and generating a down-sampled second frame by selecting a pixel of a second location that is different from the first location of each of the split first pixel groups; performing motion prediction on the down-sampled block by referring to the down-sampled second frame and obtaining a motion vector of the down-sampled block; and expanding the motion vector based on a down sampling rate of the first frame.

According to one or more exemplary embodiments, a hierarchical motion prediction apparatus includes an adaptive down sampler configured to split a first frame including a block that is to be motion-predicted into first pixel groups, selecting a pixel of a first location from each of the split first pixel groups, generate a down-sampled block and a down-sampled first frame of the block that is to be motion-predicted, split a second frame that is encoded and then reconstructed into second pixel groups for motion prediction of the down-sampled block, and generate a down-sampled second frame by selecting a pixel of a second location that is different from the first location of each of the split first pixel groups; and a motion prediction performer configured to perform motion prediction on the down-sampled block by referring to the down-sampled second frame and obtaining a motion vector of the down-sampled block and expanding the motion vector based on a down sampling rate of the first frame.

Each of the split first pixel groups may comprise four pixels of a left upper first pixel, a right upper second pixel, a left lower third pixel, and a right lower fourth pixel that are adjacent to each other, wherein, in the generating of the down-sampled first frame, a pixel of the first location is selected from the four pixels included in the first pixel groups of the first frame, and wherein, in the generating of the down-sampled second frame, a pixel of the second location that is different from the first location is selected from the four pixels included in the second pixel groups of the second frame.

The first location and the second location may be determined based on a motion vector of a previous frame encoded before the first frame and the second frame are encoded.

The first location and the second location may be determined according to one of an average value of motion vectors of blocks included in the previous frame and whether a horizontal axis direction component and a vertical axis direction component of a global motion vector of the previous frame have odd values.

If the horizontal axis direction component has an odd value, the second location may be a location moved by one pixel in a horizontal direction from a pixel at the first location from among the pixels included in each of the first split pixel groups.

If the vertical axis direction component has an odd value, the second location may be a location moved by one pixel in a vertical direction from a pixel at the first location from among the pixels included in each of the split first pixel groups.

The expanding of the motion vector may comprise: when each of the split pixel groups comprises an m number of pixels (where m is an integer) in a horizontal direction and an n number of pixels (where n is an integer) in a vertical direction, expanding a horizontal axis component of the obtained motion vector by m times and expanding a vertical axis component of the obtained motion vector by n times.

The hierarchical motion prediction method may further comprise adjusting the expanded motion vector by determining a corresponding block that is most similar to the block that is to be motion-predicted within a search range corresponding to a region of the second frame indicated by the expanded motion vector indicates.

The operation of splitting the first frame may comprise one from among asymmetrical splitting and symmetrical splitting.

A process for down-sampling the first frame may be different from a process for down-sampling the second frame.

The second frame may be split before the first frame is encoded.

A non-transitory computer-readable recording medium may have recorded thereon a computer program for executing the above-described method.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
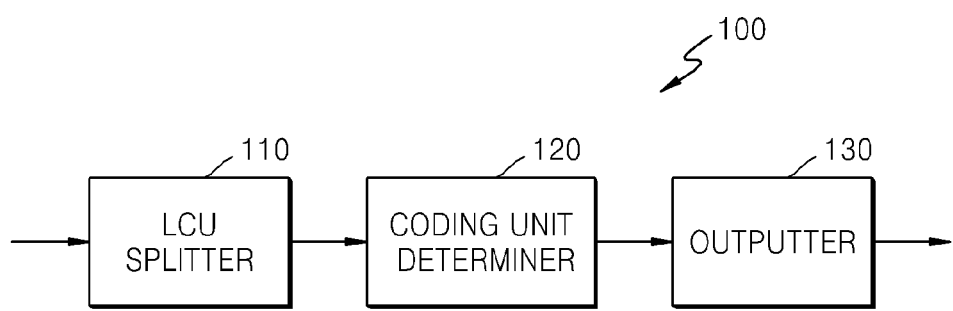
FIG. 1 is a block diagram of a video encoding apparatus, according to an exemplary embodiment.

Reference will now be made in detail to embodiments, examples of which are illustrated in the accompanying drawings, wherein like reference numerals refer to the like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

Video encoding and video decoding based on hierarchical data units, according to exemplary embodiments, will be described with reference to FIGS. 1 through 13. Also, a video encoding method and apparatus and video decoding method and apparatus that present parallel processing types by using a unified syntax, according to exemplary embodiments, will be described with reference to FIGS. 14 through 22.

FIG. 1 is a block diagram of a video encoding apparatus 100, according to an exemplary embodiment.

The video encoding apparatus 100 includes a largest coding unit (LCU) splitter 110, a coding unit determiner 120, and an outputter 130.

The LCU splitter 110 may split a current picture based on a LCU, which is a coding unit having a maximum size for a current picture of an image. If the current picture is larger than the LCU, image data of the current picture may be split into the at least one LCU. The LCU according to an exemplary embodiment may be a data unit having a size of 32×32, 64×64, 128×128, 256×256, etc., wherein a shape of the data unit is a square greater than 8×8 and having a width and length in multiples of 2. The image data may be output to the coding unit determiner 120 according to the at least one LCU.

A coding unit according to an exemplary embodiment may be characterized by a maximum size and a depth. The depth denotes the number of times the coding unit is spatially split from the LCU, and as the depth deepens, deeper coding units according to depths may be split from the LCU to a smallest coding unit (SCU). A depth of the LCU is an uppermost depth and a depth of the SCU is a lowermost depth. Since a size of a coding unit corresponding to each depth decreases as the depth of the LCU deepens, a coding unit corresponding to an upper depth may include a plurality of coding units corresponding to lower depths.

As described above, the image data of the current picture is split into the LCUs according to a maximum size of the coding unit, and each of the LCUs may include deeper coding units that are split according to depths. Since the LCU according to an exemplary embodiment is split according to depths, the image data of the space domain included in the LCU may be hierarchically classified according to depths.

A maximum depth and a maximum size of a coding unit, which limit the total number of times a height and a width of the LCU are hierarchically split, may be predetermined.

The coding unit determiner 120 encodes at least one split region obtained by splitting a region of the LCU according to depths, and determines a depth to output a finally encoded image data according to the at least one split region. In other words, the coding unit determiner 120 determines a coded depth by encoding the image data in the deeper coding units according to depths, according to the LCU of the current picture, and selecting a depth having the least encoding error. The determined coded depth and the encoded image data according to the determined coded depth are output to the outputter 130.

The image data in the LCU is encoded based on the deeper coding units corresponding to at least one depth equal to or below the maximum depth, and the results of encoding the image data are compared based on each of the deeper coding units. A depth having the least encoding error may be selected after comparing encoding errors of the deeper coding units. At least one coded depth may be selected for each LCU.

The size of the LCU is split as a coding unit is hierarchically split according to depths, and as the number of coding units increases. Also, even if coding units correspond to the same depth in one LCU, it is determined whether to split each of the coding units corresponding to the same depth to a lower depth by separately measuring an encoding error of the image data of the each coding unit. Accordingly, even when image data is included in one LCU, the encoding errors may differ according to regions in the one LCU, and thus the coded depths may differ according to regions in the image data. Thus, one or more coded depths may be determined in one LCU, and the image data of the LCU may be divided according to coding units of at least one coded depth.

Accordingly, the coding unit determiner 120 may determine coding units having a tree structure included in the LCU. The 'coding units having a tree structure' according to an exemplary embodiment include coding units corresponding to a depth determined to be the coded depth, from among all deeper coding units included in the LCU. A coding unit of a coded depth may be hierarchically determined according to depths in the same region of the LCU, and may be independently determined in different regions. Similarly, a coded depth in a current region may be independently determined from a coded depth in another region.

A maximum depth according to an exemplary embodiment is an index related to the number of splitting times from a LCU to an SCU. A first maximum depth according to an exemplary embodiment may denote the total number of splitting times from the LCU to the SCU. A second maximum depth according to an exemplary embodiment may denote the total number of depth levels from the LCU to the SCU. For example, when a depth of the LCU is 0, a depth of a coding unit, in which the LCU is split once, may be set to 1, and a depth of a coding unit, in which the LCU is split twice, may be set to 2. Here, if the SCU is a coding unit in which the LCU is split four times, 5 depth levels of depths 0, 1, 2, 3, and 4 exist, and thus the first maximum depth may be set to 4, and the second maximum depth may be set to 5.

Prediction encoding and transformation may be performed according to the LCU. The prediction encoding and the transformation are also performed based on the deeper coding units according to a depth equal to or depths less than the maximum depth, according to the LCU.

Since the number of deeper coding units increases whenever the LCU is split according to depths, encoding, including the prediction encoding and the transformation, is performed on all of the deeper coding units generated as the depth deepens. For convenience of description, the prediction encoding and the transformation will now be described based on a coding unit of a current depth, in a LCU.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit in order to perform the prediction encoding on the image data in the coding unit.

In order to perform prediction encoding in the LCU, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as a 1:n or n:1 ratio, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

Hereinafter, the data unit that is a basis for the transformation will now be referred to as a 'transformation unit'. The transformation unit in the coding unit may be recursively split into smaller sized regions in a similar manner as the coding unit. Thus, residues in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a LCU and methods of determining a prediction unit/partition, and a transformation unit, according to exemplary embodiments, will be described in detail below with reference to FIGS. 3 through 12.

The coding unit determiner 120 may measure an encoding error of deeper coding units according to depths by using Rate-Distortion Optimization based on Lagrangian multipliers.

The outputter 130 outputs the image data of the LCU, which is encoded based on the at least one coded depth determined by the coding unit determiner 120, and information about the encoding mode according to the coded depth, in bitstreams.

The encoded image data may be obtained by encoding residues of an image.

The information about the encoding mode according to coded depth may include information about the coded depth, information about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one LCU, and information about at least one encoding mode is determined for a coding unit of a coded depth, information about at least one encoding mode may be determined for one LCU. Also, a coded depth of the image data of the LCU may be different according to locations since the image data is hierarchically split according to depths, and thus information about the coded depth and the encoding mode may be set for the image data.

Accordingly, the outputter 130 may assign encoding information about a corresponding coded depth and an encoding mode to at least one of the coding unit, the prediction unit, and a minimum unit included in the LCU.

The minimum unit according to an exemplary embodiment is a square data unit obtained by splitting the SCU constituting the lowermost depth by 4. Alternatively, the minimum unit according to an exemplary embodiment may be a maximum square data unit that may be included in all of the coding units, prediction units, and transformation units included in the LCU.

For example, the encoding information output by the outputter 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream.

In the video encoding apparatus 100, the deeper coding unit may be a coding unit obtained by dividing a height or width of a coding unit of an upper depth, which is a depth one layer above the deeper coding unit, by two. In other words, when the size of the coding unit of the current depth is 2N×2N, the size of the coding unit of the lower depth is N×N. Also, the coding unit with the current depth having a size of 2N×2N may include a maximum of 4 of the coding units of the lower depth.

Accordingly, the video encoding apparatus 100 may form the coding units having the tree structure by determining coding units having an optimum shape and an optimum size for each LCU, based on the size of the LCU and the maximum depth determined considering characteristics of the current picture. Also, since encoding may be performed on each LCU by using any one of various prediction modes and transformations, an optimum encoding mode may be determined considering characteristics of the coding unit of various image sizes.

Thus, if an image having a high resolution or a large amount of data is encoded in a conventional macroblock, the number of macroblocks per picture excessively increases data. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit and considering a size of the image.

Figure 2:
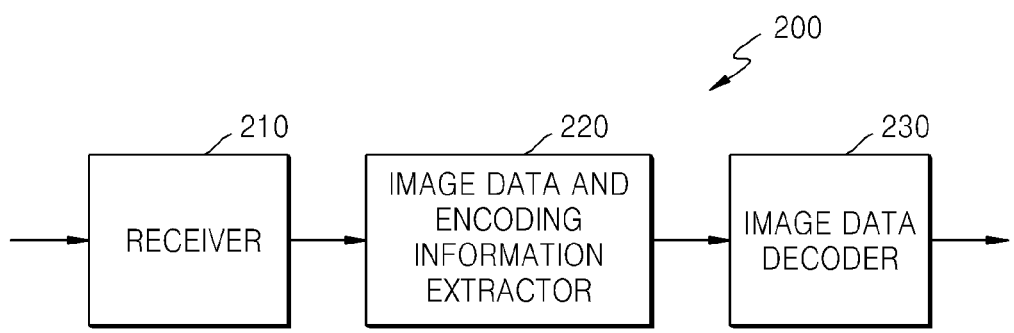
FIG. 2 is a block diagram of a video decoding apparatus, according to an exemplary embodiment.

FIG. 2 is a block diagram of a video decoding apparatus 200, according to an exemplary embodiment of the present invention.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various processing of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each LOU, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having a tree structure according to each LCU, from the parsed bitstream. The extracted information related to the coded depth and the encoding mode is output to the image data decoder 230. In other words, the image data in a bit stream is split into the LCU so that the image data decoder 230 decodes the image data for each LCU.

The information related to the coded depth and the encoding mode according to the LCU may be set for information related to at least one coding unit corresponding to the coded depth, and information related to an encoding mode may include information about a partition type of a corresponding coding unit corresponding to the coded depth, information about a prediction mode, and a size of a transformation unit. Also, splitting information according to depths may be extracted as the information about the coded depth.

The information about the coded depth and the encoding mode according to each LCU extracted by the image data and encoding information extractor 220 is information related to a coded depth and an encoding mode determined to generate a minimum encoding error when an encoder, such as the video encoding apparatus 100, repeatedly performs encoding for each deeper coding unit according to depths according to each LCU. Accordingly, the video decoding apparatus 200 may reconstruct an image by decoding the image data according to a coded depth and an encoding mode that generates the minimum encoding error.

Since encoding information related to the coded depth and the encoding mode may be assigned to a predetermined data unit from among a corresponding coding unit, a prediction unit, and a minimum unit, the image data and encoding information extractor 220 may extract the information related to the coded depth and the encoding mode according to the predetermined data units. If information related to a coded depth and encoding mode of a corresponding LCU is recorded according to predetermined data units, the predetermined data units to which the same information related to the coded depth and the encoding mode is assigned, may be inferred to be the data units included in the same LCU.

The image data decoder 230 reconstructs the current picture by decoding the image data in each LCU based on the information related to the coded depth and the encoding mode according to the LCUs. In other words, the image data decoder 230 may decode the encoded image data based on the extracted information related to the partition type, the prediction mode, and the transformation unit for each coding unit from among the coding units having the tree structure included in each LCU. A decoding process may include a prediction including intra prediction and motion compensation, and an inverse transformation.

The image data decoder 230 may perform intra prediction or motion compensation according to a partition and a prediction mode of each coding unit, based on the information related to the partition type and the prediction mode of the prediction unit of the coding unit according to coded depths.

In addition, the image data decoder 230 may also perform inverse transformation based on transformation units for each coding unit based on size information related to a transformation unit according to a tree structure for each coding unit, for inverse transformation for each LCU.

The image data decoder 230 may determine a coded depth of a current LCU by using split information according to depths. If the split information indicates that image data is no longer split in the current depth, the current depth is a coded depth. Accordingly, the image data decoder 230 may decode encoded data in the current LCU by using the information related to the partition type of the prediction unit, the prediction mode, and the size of the transformation unit for each coding unit corresponding to the coded depth.

In other words, data units containing the encoding information including the same split information may be obtained by observing the encoding information set assigned for the predetermined data unit from among the coding unit, the prediction unit, and the minimum unit, and the obtained data units may be considered to be one data unit to be decoded by the image data decoder 230 in the same encoding mode.

The video decoding apparatus 200 may obtain information related to at least one coding unit that generates the minimum encoding error when encoding is recursively performed for each LCU, and may use the information to decode the current picture. In other words, the coding units having the tree structure determined to be the optimum coding units in each LCU may be decoded.

Accordingly, even if the image data has a high resolution and a large amount of data, the image data may be efficiently decoded and reconstructed by using a size of a coding unit and an encoding mode, which are adaptively determined according to characteristics of the image data, by using information about an optimum encoding mode received from an encoder.

Coding units according to a tree structure and methods of determining a prediction unit, and a transformation unit, according to exemplary embodiments, will be described in detail below with reference to FIGS. 3 through 13.

Figure 3:
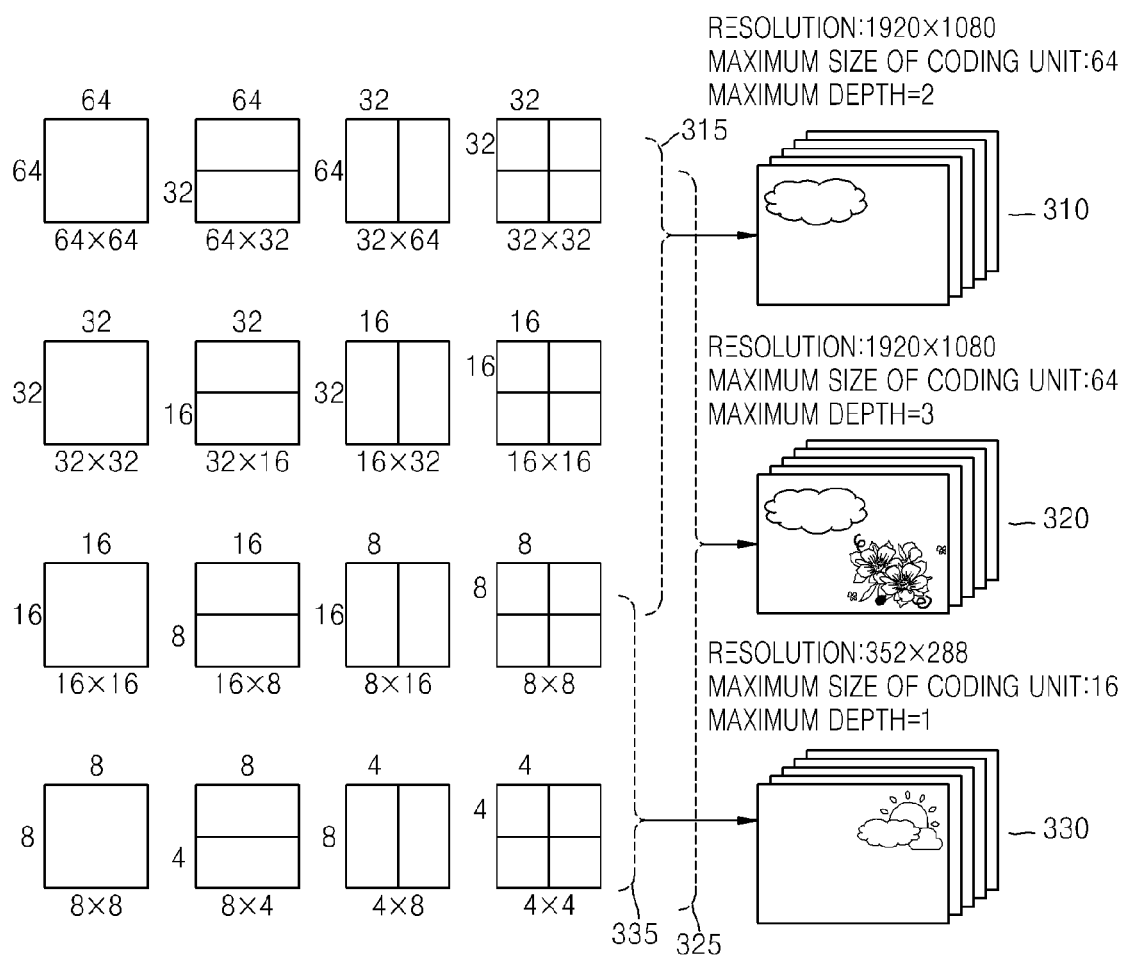
FIG. 3 is a diagram for describing a concept of coding units according to an exemplary embodiment.

FIG. 3 is a diagram for describing a concept of coding units according to an exemplary embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a LCU to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a LCU having a long axis size of 64, and coding units having long axis sizes of 32 and 16 since depths are deepened to two layers by splitting the LCU twice. Since the maximum depth of the video data 330 is 1, coding units 335 of the video data 330 may include a LCU having a long axis size of 16, and coding units having a long axis size of 8 since depths are deepened to one layer by splitting the LCU once.

Since the maximum depth of the video data 320 is 3, coding units 325 of the video data 320 may include a LCU having a long axis size of 64, and coding units having long axis sizes of 32, 16, and 8 since the depths are deepened to 3 layers by splitting the LCU three times. As a depth deepens, detailed information may be precisely expressed.

Figure 4:
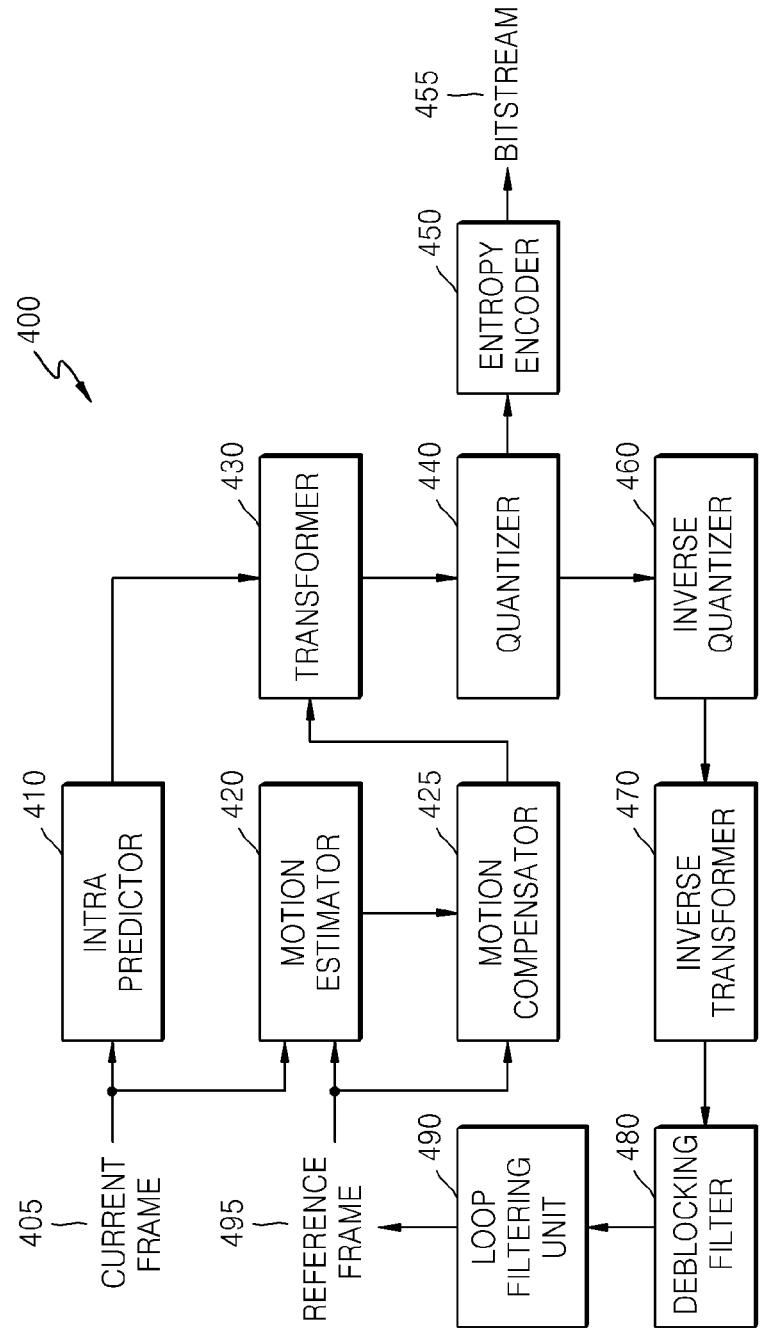
FIG. 4 is a block diagram of an image encoder based on coding units, according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is reconstructed as data in the space domain through an inverse quantizer 460 and a frequency inverse transformer 470, and the reconstructed data in the space domain is output as the reference frame 495 after being post-processed through a deblocking filter 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the frequency inverse transformer 470, the deblocking filter 480, and the loop filtering unit 490 perform operations based on each coding unit among coding units having a tree structure while considering the maximum depth of each LCU.

Specifically, the intra predictor 410, the motion estimator 420, and the motion compensator 425 determines partitions and a prediction mode of each coding unit from among the coding units having a tree structure while considering the maximum size and the maximum depth of a current LCU, and the transformer 430 determines the size of the transformation unit in each coding unit from among the coding units having a tree structure.

Figure 5:
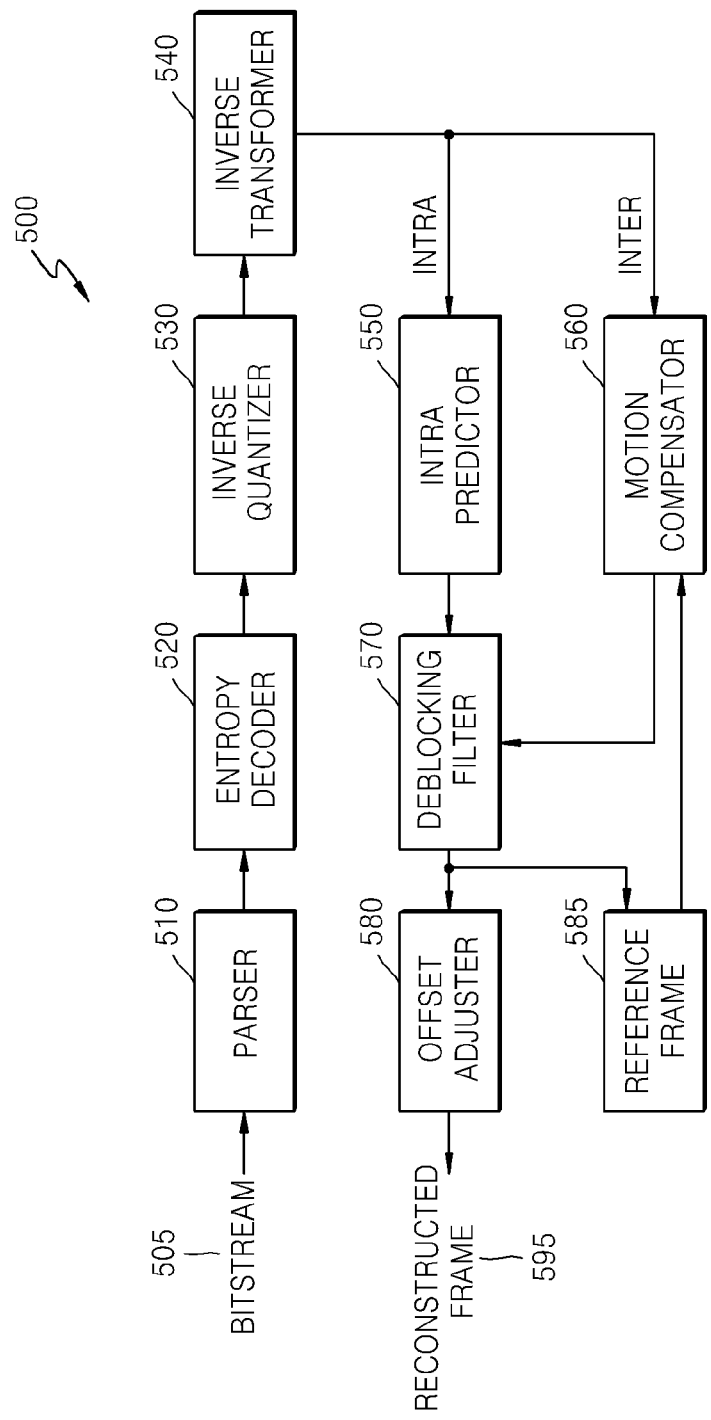
FIG. 5 is a block diagram of an image decoder based on coding units, according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is reconstructed to image data in the space domain through an inverse transformer 540.

An intra predictor 550 performs intra prediction on coding units in an intra mode with respect to the image data in the space domain, and a motion compensator 560 performs motion compensation on coding units in an inter mode by using a reference frame 585.

The image data in the space domain, which passes through the intra predictor 550 and the motion compensator 560, may be output as a reconstructed frame 595 after being post-processed through a deblocking filter 570 and an offset adjuster 580. Also, the image data that is post-processed through the deblocking filter 570 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking filter 570, and the offset adjuster 580 perform operations based on coding units having a tree structure for each LCU.

Specifically, the intra predictor 550 and the motion compensator 560 perform operations based on partitions and a prediction mode for each of the coding units having a tree structure, and the inverse transformer 540 perform operations based on a size of a transformation unit for each coding unit.

Figure 6:
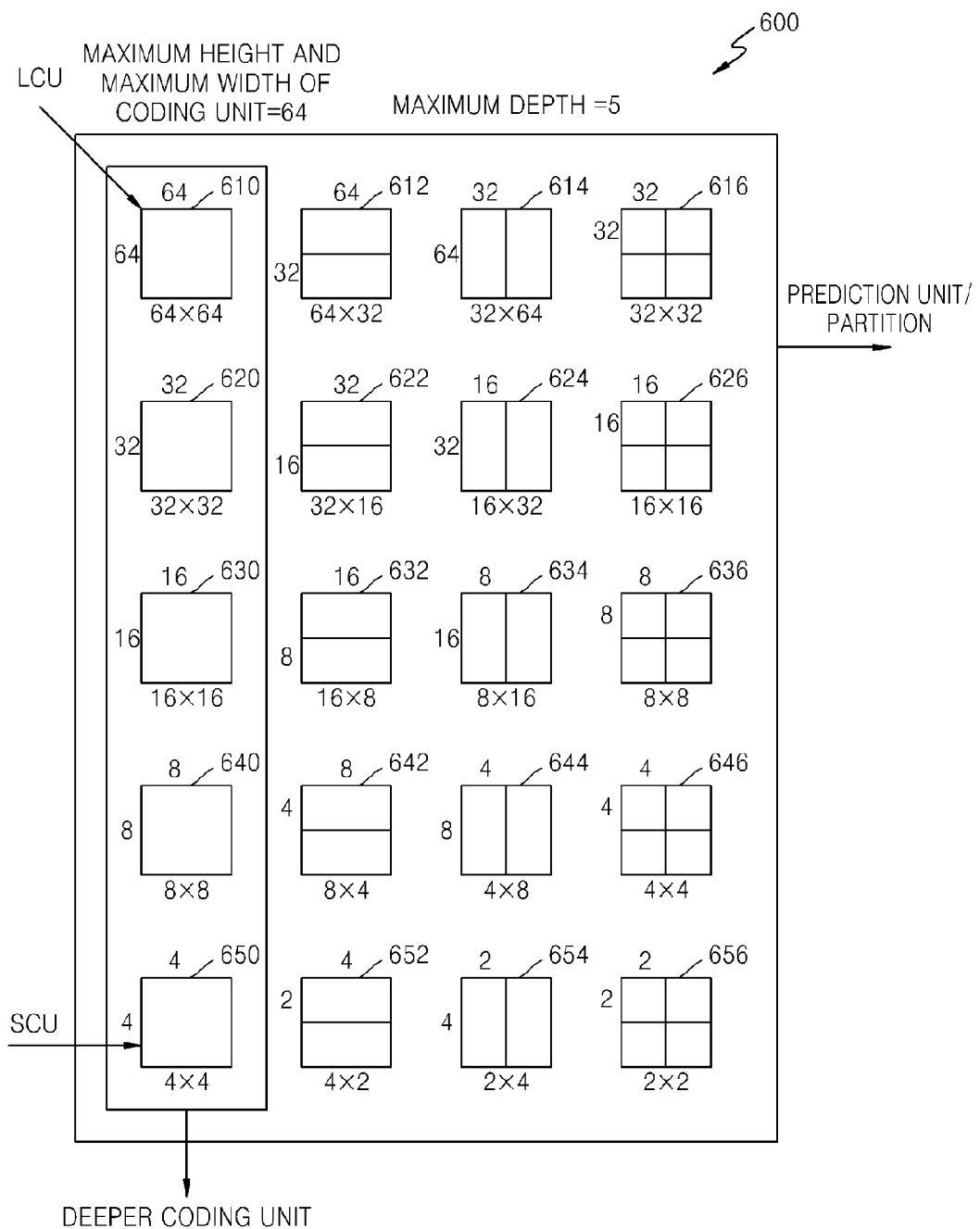
FIG. 6 is a diagram illustrating deeper coding units according to depths, and partitions, according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units when considering characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a LCU in the hierarchical structure 600, wherein a depth is 0 and a size, i.e., a height by width, is 64×64. The depth deepens along the vertical axis, where a coding unit 620 has a size of 32×32 and a depth of 1, a coding unit 630 has a size of 16×16 and a depth of 2, a coding unit 640 has a size of 8×8 and a depth of 3, and a coding unit 650 has a size of 4×4 and a depth of 4. The coding unit 650 having a size of 4×4 and a depth of 4 is an SCU.

The prediction unit and the partitions of a coding unit are arranged along the horizontal axis according to each depth. In other words, if the coding unit 610 having a size of 64×64 and a depth of 0 is a prediction unit, the prediction unit may be split into partitions included in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 has the size of 32×32 and the depth of 1 may be split into partitions included in the coding unit 620, i.e. a partition 620 has a size of 32×32, partition 622 has a size of 32×16, partition 624 has a size of 16×32, and partitions 626 has a size of 16×16.

Similarly, a prediction unit of the coding unit 630 has the size of 16×16 and the depth of 2 may be split into partitions included in the coding unit 630, i.e. a partition has a size of 16×16 included in the coding unit 630, partition 632 has a size of 16×8, partition 634 has a size of 8×16, and partition 636 has a size of 8×8.

Similarly, a prediction unit of the coding unit 640 having the size of 8×8 and the depth of 3 may be split into partitions included in the coding unit 640, i.e. a partition has a size of 8×8 included in the coding unit 640, partition 642 has a size of 8×4, partition 644 has a size of 4×8, and partition 646 has a size of 4×4.

Lastly, the coding unit 650 having a size of 4×4 and a depth of 4 is the SCU and a lowest depth coding unit, and a corresponding prediction unit thereof may be set only as partition 650 having a size of 4×4.

In order to determine the at least one coded depth of the coding units constituting the LCU 610, the coding unit determiner 120 of the video encoding apparatus 100 performs encoding for coding units corresponding to each depth included in the LCU 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among all the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, and by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
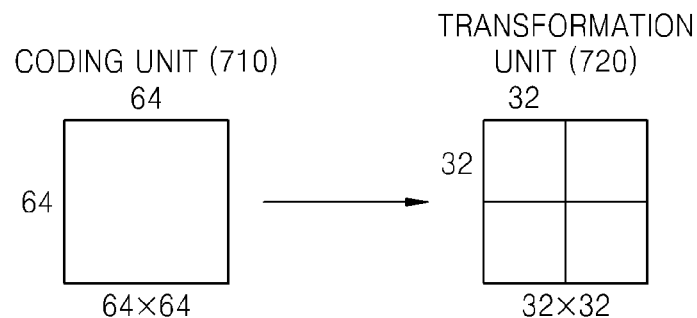
FIG. 7 is a diagram for describing a relationship between a coding unit and transformation units, according to an exemplary embodiment.

FIG. 7 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a LCU for each LCU. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
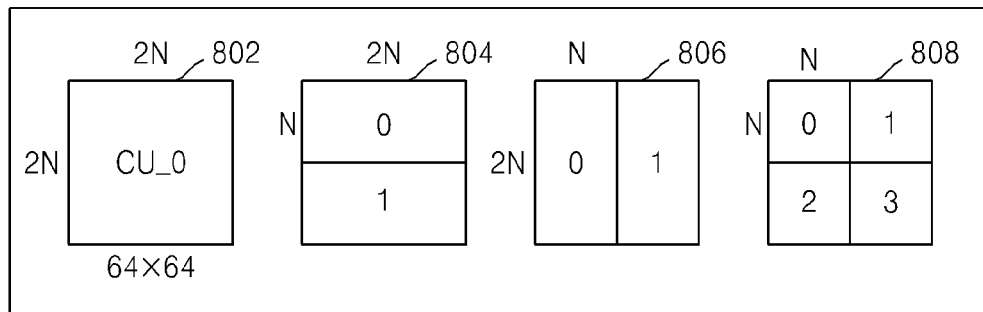
FIG. 8 is a diagram for describing encoding information of coding units corresponding to a coded depth, according to an exemplary embodiment.
Figure 8:
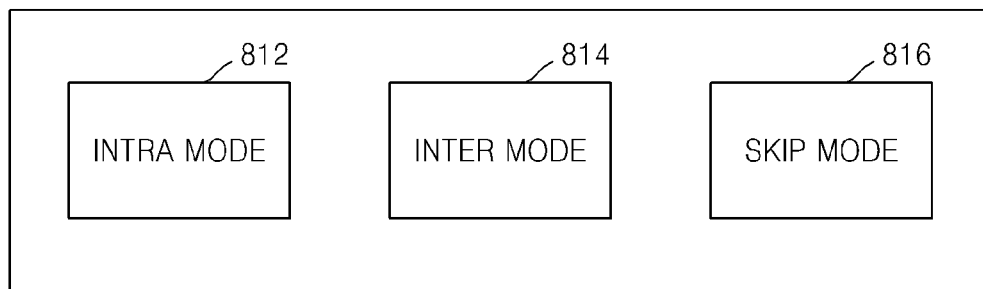
Figure 8:
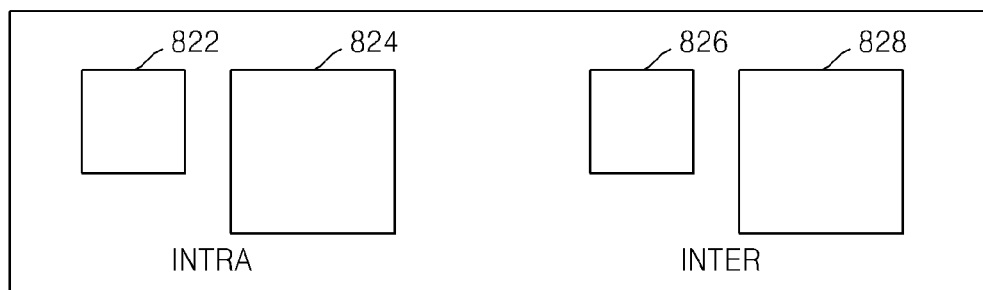

FIG. 8 is a diagram for describing encoding information of coding units corresponding to a coded depth, according to an exemplary embodiment.

The outputter 130 of the video encoding apparatus 100 may encode and transmit information 800 related to a partition type, information 810 related to a prediction mode, and information 820 related to a size of a transformation unit for each coding unit corresponding to a coded depth, as information related to an encoding mode.

The information 800 indicates information related to a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N.

Here, the information 800 related to a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 9:
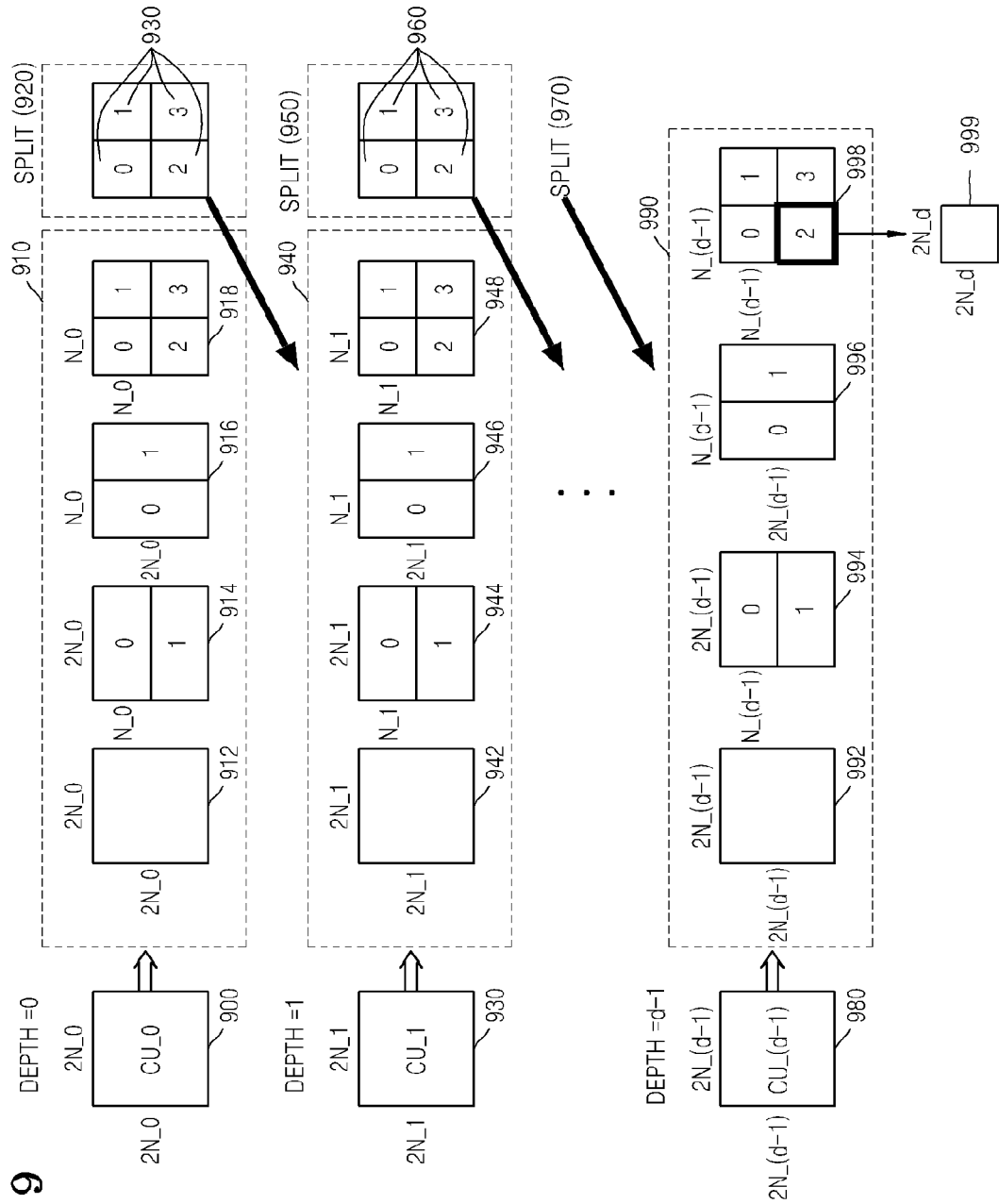
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding units 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current LCU 900 is determined to be d−1 and a partition type of the current LCU 900 may be determined to be N_(d−1)× N_(d−1). Also, since the maximum depth is d and an SCU 980 having a lowermost depth of d−1 is no longer split to a lower depth, split information for the SCU 980 is not set.

A data unit 999 may be a 'minimum unit' for the current LCU. A minimum unit according to an exemplary embodiment may be a square data unit obtained by splitting an SCU 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information related to the coded depth and the prediction unit of the coding unit 900 to decode the partition 912. The video decoding apparatus 200 may determine a depth, in which split information is 0, as a coded depth by using split information according to depths, and use information related to an encoding mode of the corresponding depth for decoding.

Figure 10:
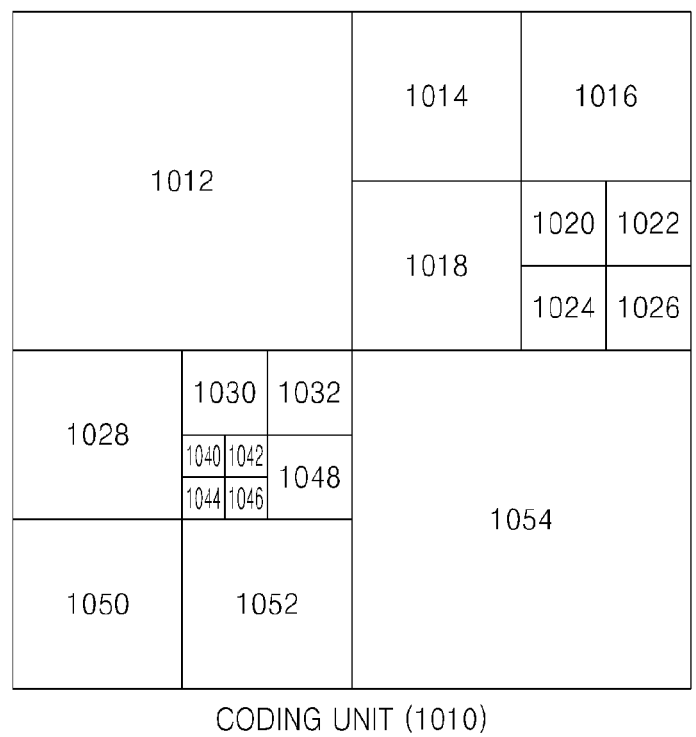
FIGS. 10 through 12 are diagrams for describing a relationship between coding units, prediction units, and transformation units, according to an exemplary embodiment.
Figure 11:
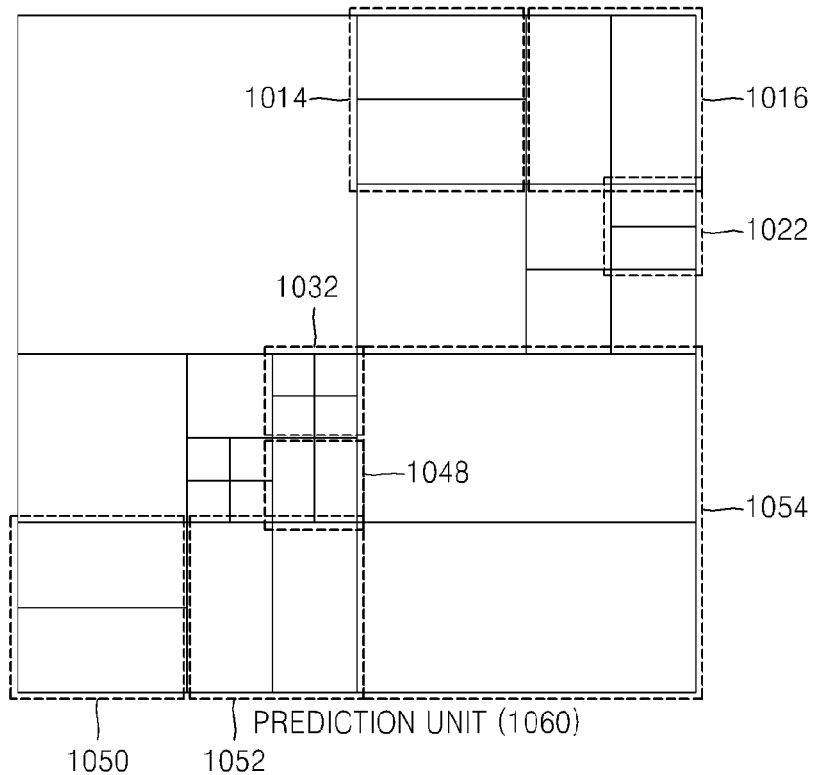
Figure 12:
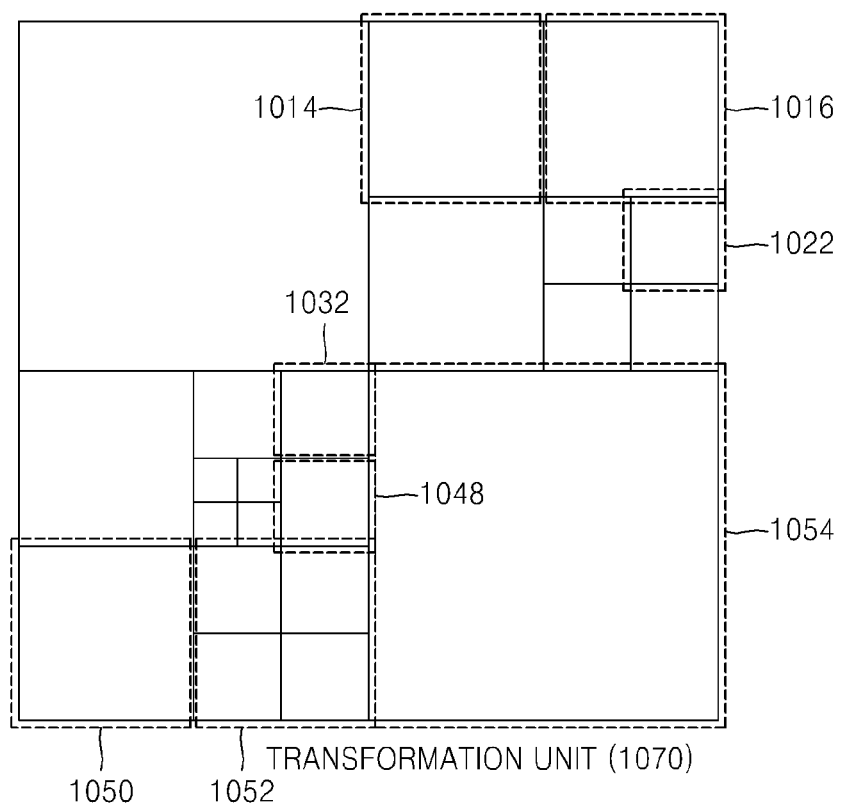

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a LCU. The prediction units 1060 are partitions of prediction units of each of the coding units 1010, and the transformation units 1070 are transformation units of each of the coding units 1010.

When a depth of a LCU is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1010 in the transformation units 1070 in a data unit that is smaller than the coding unit 1052 of the coding unit 1010. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of the coding units having a hierarchical structure in each region of a LCU to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The outputter 130 of the video encoding apparatus 100 may output the encoding information related to the coding units having a tree structure, and the image data and encoding information extractor 220 of the video decoding apparatus 200 may extract the encoding information related to the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information related to a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit according to a 1:3 and 3:1 ratio, and the asymmetrical partition types having the sizes of nL×2N and nR×2N may be respectively obtained by splitting the width of the prediction unit according to a 1:3 and 3:1 ratio.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information related to coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a LCU may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 13:
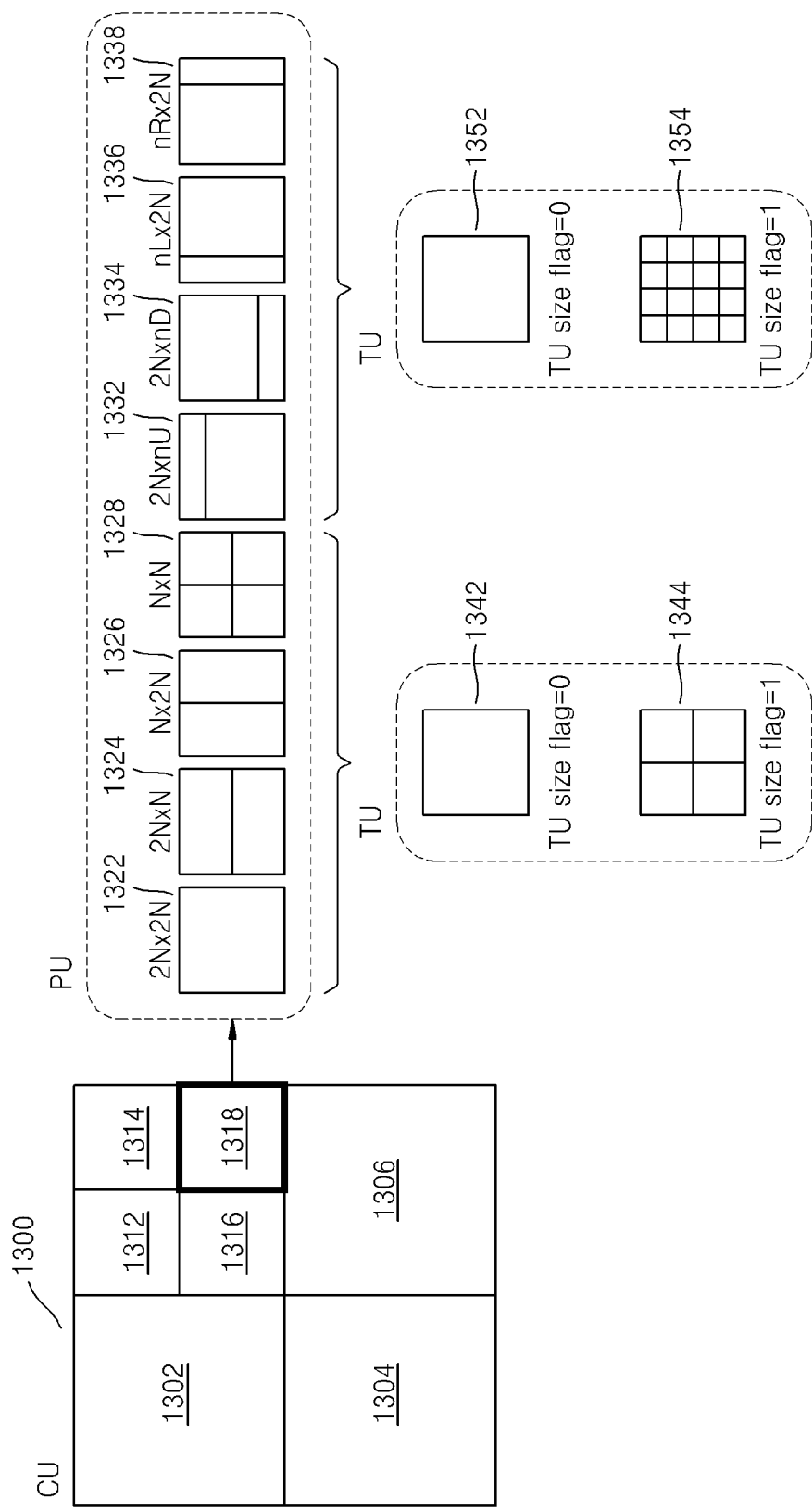
FIG. 13 is a diagram for describing a relationship between a coding unit, a prediction unit, and a transformation unit, according to encoding mode information of Table 1.

FIG. 13 is a diagram for describing a relationship between a coding unit, a prediction unit, and a transformation unit, according to encoding mode information of Table 1.

A LCU 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

For example, when the partition type is set to be symmetrical, i.e. the partition type is 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, i.e., the partition type is 1332, 1334, 1336, or 1338, a transformation unit 1352 having a size of 2N×2N is set if a TU size flag is 0, and a transformation unit 1354 having a size of N/2×N/2 is set if a TU size flag is 1.

A hierarchical motion prediction process performed by the motion estimator 420 of the image encoder 400 of FIG. 4 according to an exemplary embodiment will now be described in detail below.

As described above, the motion estimator 420 and the motion compensator 425 may perform motion prediction and motion compensation on the coding units having a tree structure according to prediction units. A prediction unit that is a unit of motion prediction and motion compensation is referred to as a block below.

Hierarchical motion prediction is a process of obtaining a motion vector by performing motion prediction by using a down-sampled current frame and a down-sampled reference frame, and expanding the motion vector generated by performing motion prediction based on a down sampling rate. A high resolution image frame includes many pixels, and thus an amount of calculation used to perform motion prediction may increase. Thus, according to exemplary embodiments, motion prediction is performed by using down-sampled frames having reduced resolutions to expedite a motion prediction process.

Figure 14:
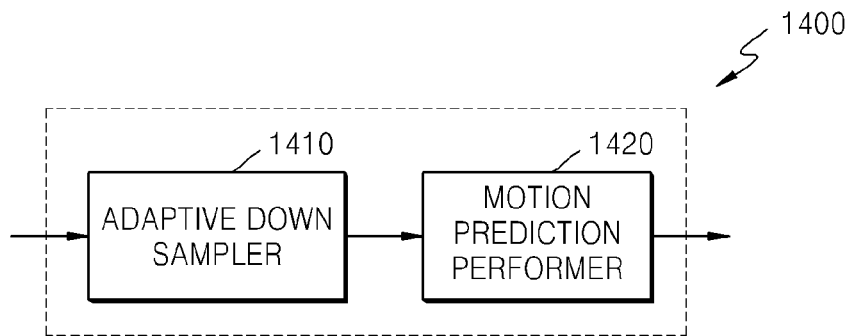
FIG. 14 is a block diagram of a hierarchical motion prediction apparatus, according to an exemplary embodiment.

FIG. 14 is a block diagram of a hierarchical motion prediction apparatus 1400 according to an exemplary embodiment. The hierarchical motion prediction apparatus 1400 of FIG. 14 corresponds to the motion estimator 420 of FIG. 4.

Referring to FIG. 14, the hierarchical motion prediction apparatus 1400 includes an adaptive down sampler 1410 and a motion prediction performer 1420.

The adaptive down sampler 1410 outputs a down-sampled image frame by reducing the resolution of an input image frame. As described above, the resolution of the input image frame is reduced so as to enable high speed motion prediction.

The adaptive down sampler 1410 splits a current frame including a current block that is to be motion-predicted into pixel groups constituting a predetermined number of adjacent pixels. The adaptive down sampler 1410 may perform down sampling on the current frame by selecting and outputting a predetermined pixel of a first location from each pixel group. That is, the adaptive down sampler 1410 performs down sampling by selecting and outputting a predetermined single pixel of the first location from among a plurality of pixels included in the pixel groups. The adaptive down sampler 1410 may also split a reference frame to which the current frame refers, into pixel groups constituting a predetermined number of adjacent pixels and perform down sampling on the reference frame by selecting and outputting a pixel of a second location that is different from the first location used to perform down sampling on the current frame from each pixel group of the reference frame. As such, the adaptive down sampler 1410 may not use an invariable down sampling method when performing down sampling on the current frame and the reference frame but may change a down sampling method for each frame. That is, the adaptive down sampler 1410 may change a location of a pixel selected from each pixel group for each frame.

In more detail, it is assumed that the image frame includes a W number of pixels (where W is an integer) in a horizontal direction and an H number of pixels (where H is an integer) in a vertical direction and has a W×H resolution. It is assumed that a pixel of a location (x,y) (x,y are integer numbers of 0≤x<W/2, 0≤y<H/2) included in an image frame input at a $t^{th}$ time (where t is an integer) is F(x,y,t). It is assumed that a left uppermost pixel among pixels of a $t^{th}$ frame is F(0,0,t), and a right lowermost pixel is F((W−1), (H−1), t). It is assumed that a pixel group includes four pixels of a left upper first pixel, a right upper second pixel, a left lower third pixel, and a right lower fourth pixel that are adjacent to each other. In the above-described example, the first through fourth pixels included in an optional pixel group of the $t^{th}$ frame are F(2x, 2y,t), F(2x+1, 2y,t), F(2x, 2y+1,t), and F(2x+1, 2y+1,t), respectively. It is also assumed that a pixel of the location (x,y) of the down-sampled image frame is f(x,y,t). In this case, a down sampling process may be performed according to equation 1 below.

$$f(x,y,t)=F(2x+dx(t),2y+dy(t),t) \quad \text{[Equation 1]}$$

In equation 1, dx(t) and dy(t) are values used to vary locations of the four pixels included in the pixel group of the $t^{th}$ frame, which may be variably set according to a value of t, i.e. a frame. As described above, when the pixel group includes four pixels that are adjacent to each other, dx(t) and dy(t) have values of 0 or 1. A location of a pixel selected from the pixel group may be changed according to values of dx(t) and dy(t). For example, when dx(t)=dy(t)=0, the left upper first pixel is selected from the pixel group. When dx(t)=1, and dy(t)=0, the right upper second pixel is selected from the pixel group. When dx(t)=0, and dy(t)=1, the left lower third pixel is selected from the pixel group. When dx(t)=dy(t)=1, the right lower fourth pixel is selected from the pixel group. As described above, when the pixel group includes four pixels, the down-sampled image frame has a resolution of (W/2)×(H/2). However, the adaptive down sampling method according to an exemplary embodiment is not limited to when the pixel group includes four pixels but may be applied when a single pixel is selected from an optional pixel group of m*n (where m and n are integers).

The motion prediction performer 1420 performs motion prediction on down-sampled blocks included in the current frame by using the down-sampled current frame and the down-sampled reference frame and generates a motion vector of the down-sampled blocks. In more detail, assuming that motion prediction is performed on an image frame of an original resolution in a block unit of a size of 2N×2N (where N is an integer), in the above-described example, the motion prediction performer 1420 splits the down-sampled current frame into blocks of a size of N×N and obtains a motion vector indicating a corresponding range that is most similar to a current block from the down-sampled reference frame.

A motion vector of a block generated in a down-sampled frame is a motion vector reduced by a down sampling rate compared to an input frame of an original resolution. Thus, the motion prediction performer 1420 may expand the motion vector of the blocks obtained from the down-sampled frames to be adapted to a frame of the original resolution, based on the down sampling rate. That is, when the pixel group includes an m number of pixels (where m is an integer) in the horizontal direction and an n number of pixels (where n is an integer) in the vertical direction, the motion prediction performer 1420 may expand a horizontal axis component of the obtained motion vector by m times and expand a vertical axis component of the obtained motion vector by n times, to generate a motion vector adapted to the frame of the original resolution. As described in the above example, when the pixel group includes pixels of a size of 2×2 that are adjacent to each other, the down-sampled current frame and reference frame have resolutions reduced by ½ in the horizontal and vertical axes compared to the image frame of the original resolution. In this case, if a motion vector generated by using the down-sampled current frame and reference frame is (mv_x, mv_y), a motion vector of an original image frame is (2*mv_x, 2*mv_y) by doubling the size of the motion vector obtained from the down-sampled frames.

A down sampling process of an input image frame according to an exemplary embodiment will now be described in detail below.

Figure 15:
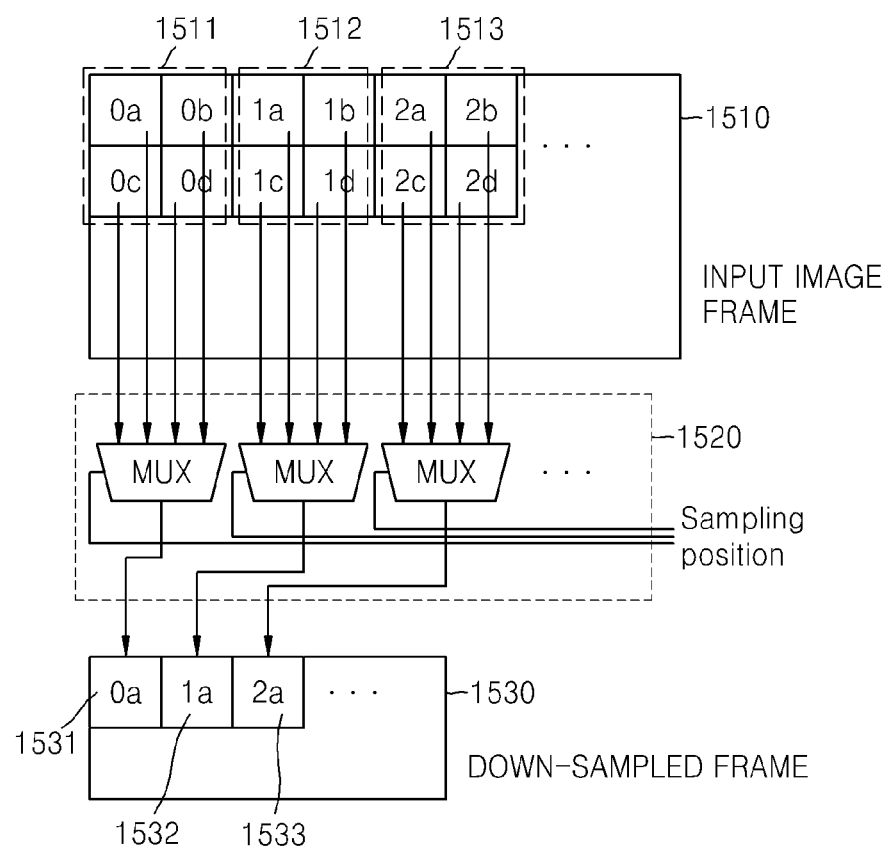
FIG. 15 is a reference view for explaining a down sampling process of an input image frame, according to an exemplary embodiment.

FIG. 15 is a reference view for explaining a down sampling process of an input image frame, according to an exemplary embodiment. An adaptive down sampler 1520 of FIG. 15 corresponds to the adaptive down sampler 1410 of FIG. 14.

Referring to FIG. 15, the adaptive down sampler 1520 receives an input of a pixel group including a predetermined number of adjacent pixels among pixels constituting the input image frame 1510, and includes a plurality of multiplexers MUXs that select and output a single pixel from among the pixels included in the input pixel group. The adaptive down sampler 1520 receives an input of pixel groups 1511, 1512, and 1513 including four adjacent pixels included in the input image frame 1510 and selects and outputs a single pixel included in each pixel group. In more detail, the adaptive down sampler 1520 may select and output a 0a pixel 1531 in a left upper side from among pixels 0a, 0b, 0c, and 0d included in a pixel group 1511, select and output a 1a pixel 1532 in a left upper side from among pixels 1a, 1b, 1c, and 1d included in a pixel group 1512, and select and output a 2a pixel 1533 in a left upper side from among pixels 2a, 2b, 2c, and 2d included in a pixel group 1513. As such, the adaptive down sampler 1520 outputs a down-sampled frame by repeating a process of selecting and outputting a single pixel with respect to all pixels included in the input image frame 1510.

The adaptive down sampler 1520 may change a location of a pixel selected from each pixel group for each image frame. For example, if a pixel in a left upper side is selected from each pixel group with respect to a $t^{th}$ image frame (where t is an integer), the adaptive down sampler 1520 may select a pixel of another location excluding the left upper location with respect to a next $(t+1)^{th}$ image frame and perform down sampling. The adaptive down sampler 1520 may change a location of a pixel selected from a pixel group of each image frame, thereby obtaining a down-sampled frame that reflects a specific motion component between image frames.

The location of the pixel selected from the pixel group may be previously determined based on a frame order. For example, a predetermined pixel of a first location may be selected from pixels of a pixel group with respect to an even image frame, and a pixel of a second location excluding the first location may be selected from pixels of a pixel group with respect to an odd image frame.

A location of a pixel that is to be selected from a pixel group of each image frame may be determined based on a motion vector of a previous frame encoded before each image frame. Information about the motion vector of the previous frame may be an average value of motion vectors of blocks included in the previous frame or a global motion vector of the previous frame. If the information of the motion vector of the previous frame is not used, as described above, a pixel of a previously determined location may be selected from a pixel group based on the frame order.

In more detail, a case of changing a pixel location with respect to a $(t-1)^{th}$ frame, a $t^{th}$ frame, and a $(t+1)^{th}$ frame and performing down sampling is explained. The adaptive down sampler 1520 may determine a pixel location that is to be selected for down sampling from each pixel group included in the $t^{th}$ frame and the $(t+1)^{th}$ frame by using an average value of motion vectors of blocks included in the $(t-1)^{th}$ frame or a global motion vector of the $(t-1)^{th}$ frame.

Assuming that the average value of motion vectors of blocks included in the $(t-1)^{th}$ frame or the global motion vector of the $(t-1)^{th}$ frame (hereinafter referred to as a "global motion vector") is (MVx_global_(t-1), MVy_global_(t-1)), when a horizontal axis direction component MVx_global_(t-1) of the global motion vector has an odd value, the adaptive down sampler 1520 selects a first location of a pixel selected from the pixel group of the $t^{th}$ frame and a second location of a pixel selected from the pixel group of the $(t+1)^{th}$ frame in such a way that the first location and the second location may be different by one pixel in a horizontal direction. When a vertical axis direction component MVy_global_(t-1) of the global motion vector has an even value, the adaptive down sampler 1520 selects the first location of the pixel selected from the pixel group of the $t^{th}$ frame and the second location of the pixel selected from the pixel group of the $(t+1)^{th}$ frame in such a way that the first location and the second location may be different by one pixel in a vertical direction.

As an example, when the horizontal axis direction component MVx_global_(t-1) of the global motion vector of the $(t-1)^{th}$ frame has an odd value, the adaptive down sampler 1520 performs down sampling on the $t^{th}$ frame according to equation 2 below.

$$f(x,y,t)=F(2x,2y,t) \quad \text{[Equation 2]}$$

That is, the adaptive down sampler 1520 performs down sampling by determining that dx(t)=dy(t)=0 and selecting a left upper first pixel from the pixel group of the $t^{th}$ frame.

The adaptive down sampler 1520 performs down sampling on the $(t+1)^{th}$ frame subsequent to the $t^{th}$ frame according to equation 3 below.

$$f(x,y,t+1)=F(2x+1,2y,t+1) \quad \text{[Equation 3]}$$

That is, the adaptive down sampler 1520 performs down sampling by determining that dx(t+1)=1, dy(t+1)=0 and selecting a right upper second pixel from the pixel group of the $(t+1)^{th}$ frame.

Similarly, when the vertical axis direction component MVy_global_(t-1) of the global motion vector of the $(t-1)^{th}$ frame has an odd value, the adaptive down sampler 1520 may perform down sampling on the $t^{th}$ frame according to equation 2 described above and perform down sampling on the $(t+1)^{th}$ frame subsequent to the $t^{th}$ frame according to equation 4 below.

$$f(x,y,t+1)=F(2x,2y+1,t+1) \quad \text{[Equation 4]}$$

That is, the adaptive down sampler 1520 performs down sampling by determining that dx(t+1)=0, dy(t+1)=1 and selecting a left lower third pixel from the pixel group of the $(t+1)^{th}$ frame.

As such, a location of a pixel sampled between continuous frames is changed by one pixel so as to more accurately predict a motion vector having an odd value present between image frames.

When the horizontal axis direction component MVx_global_(t-1) and the vertical axis direction component MVy_global_(t-1) of the global motion vector of the $(t-1)^{th}$ frame have odd values, the adaptive down sampler 1520 may perform down sampling on the $t^{th}$ frame according to equation 2 described above and perform down sampling on the $(t+1)^{th}$ frame subsequent to the $t^{th}$ frame according to equation 5 below.

$$f(x,y,t+1)=F(2x+1,2y+1,t+1) \quad \text{[Equation 5]}$$

When the horizontal axis direction component MVx_global_(t-1) and the vertical axis direction component MVy_global_(t-1) of the global motion vector of the $(t-1)^{th}$ frame have even values, the adaptive down sampler 1520 may perform down sampling on the $t^{th}$ frame and the $(t+1)^{th}$ frame by selecting pixels of (2x,2y).

Figure 16:
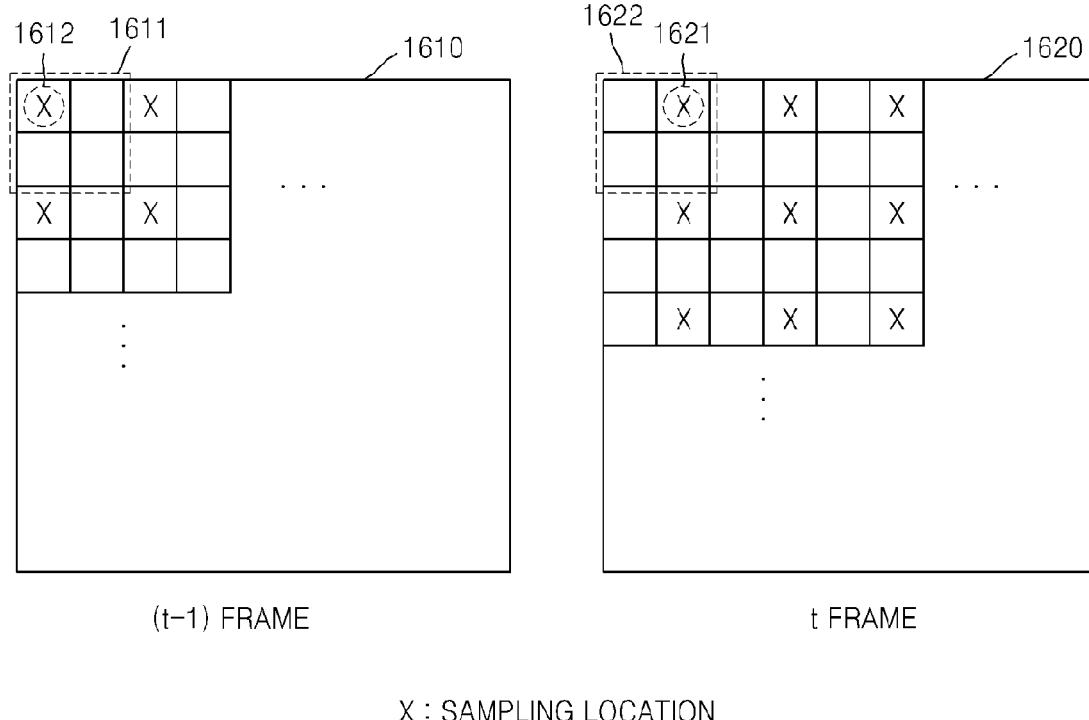
FIG. 16 shows exemplary frames down-sampled by using an adaptive down sampling method, according to an exemplary embodiment.

FIG. 16 shows exemplary frames down-sampled by using an adaptive down sampling method, according to an embodiment of the present invention.

Referring to FIG. 16, if four pixels included in a predetermined pixel group of a $(t-1)^{th}$ frame 1610 are F(2x, 2y, t-1), F(2x+1, 2y, t-1), F(2x, 2y+1, t-1), and F(2x+1, 2y+1, t-1), the adaptive down sampler 1410 selects and outputs a predetermined pixel of a first location, for example, the pixel F(2x, 2y, t-1) from each pixel group. As an example, in FIG. 16, a pixel 1612 of a location (0,0) is selected from pixels of locations (0,0), (0,1), (1,0), and (1,1) included in a pixel group 1611. A pixel of a second location that is different from the location selected with respect to the $(t-1)^{th}$ frame 1610 is selected with respect to a $t^{th}$ frame 1620. For example, if four pixels included in a predetermined pixel group of the $t^{th}$ frame 1620 are F(2x, 2y, t), F(2x+1, 2y, t), F(2x, 2y+1, t), and F(2x+1, 2y+1, t), since the pixel F(2x, 2y, t-1) corresponding to a location (2x,2) is sampled with respect to the $(t-1)^{th}$ frame 1610, the adaptive down sampler 1410 may select a pixel that is to be sampled from among the pixels excluding the pixel F(2x, 2y, t). As an example, in FIG. 16, a pixel of a location (1,0) is selected from pixels of the locations (0,0), (0,1), (1,0), and (1,1) included in a pixel group 1622, excluding the pixel of the location (0,0).

Figure 17A:
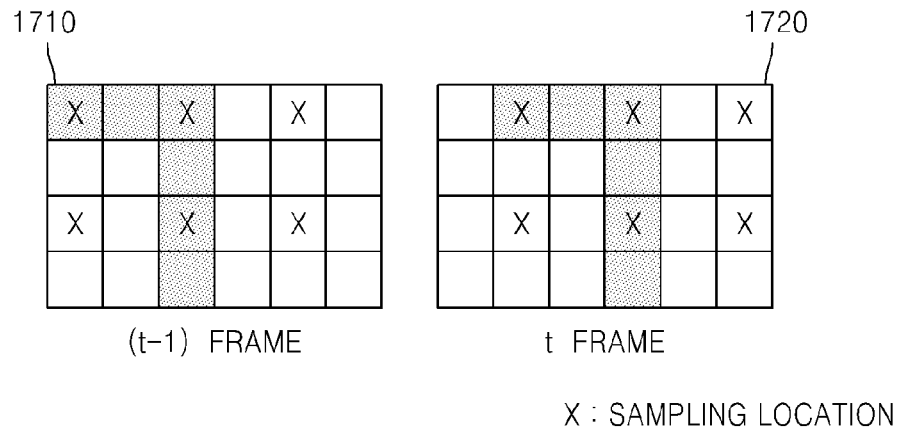
FIGS. 17A and 17B show exemplary down-sampled frames and frames that are to be down-sampled, according to an exemplary embodiment.
Figure 17B:
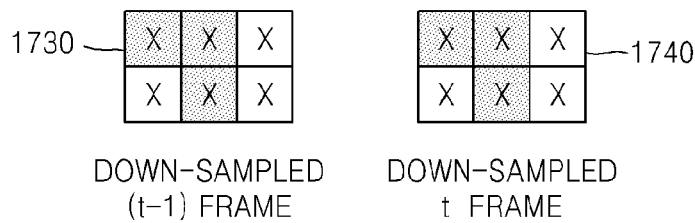

FIGS. 17A and 17B show exemplary down-sampled frames and frames that are to be down-sampled, according to an exemplary embodiment.

Referring to FIG. 17A, it is assumed that objects indicated as hatched regions are present in a $(t-1)^{th}$ frame 1710 and a $t^{th}$ frame 1720. It is assumed that the objects have motions that move by one pixel in a horizontal axis between continuous frames. As described with reference to FIG. 16, when a left upper pixel of a pixel group is sampled with respect to the $(t-1)^{th}$ frame 1710, and a right upper pixel of a pixel group is sampled with respect to the $t^{th}$ frame 1720, as shown in FIG. 17A, a down-sampled $(t-1)^{th}$ frame 1730 and a down-sampled $t^{th}$ frame 1740 are obtained, as shown in FIG. 17B.

Figure 18A:
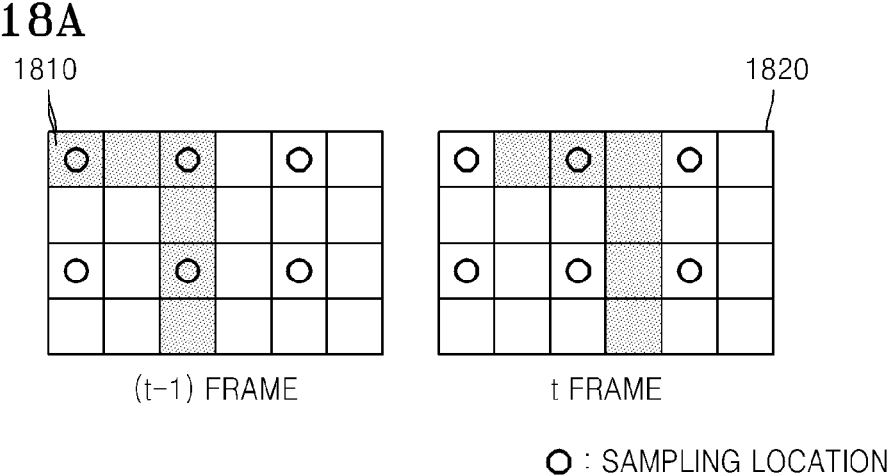
FIGS. 18A and 18B show exemplary frames down-sampled by using the same down sampling method, according to an exemplary embodiment.
Figure 18B:
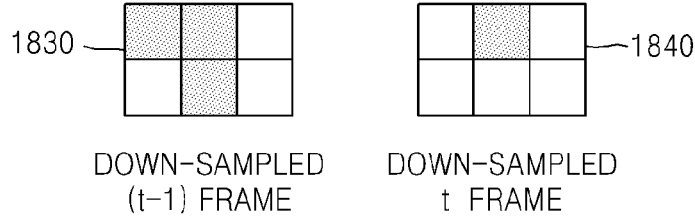

FIGS. 18A and 18B show exemplary frames down-sampled by using the same down sampling method, according to an exemplary embodiment.

Referring to FIG. 18A, it is assumed that objects indicated as hatched regions are present in a $(t-1)^{th}$ frame 1810 and a $t^{th}$ frame 1820. It is assumed that the objects have motions that move by one pixel in a horizontal axis between continuous frames. As described with reference to FIG. 16, when a left upper pixel of a pixel group indicated as "0" is sampled with respect to the $(t-1)^{th}$ frame 1810 and the $t^{th}$ frame 1820, as shown in FIG. 18B, a down-sampled $(t-1)^{th}$ frame 1830 and a down-sampled $t^{th}$ frame 1840 are obtained. In the down-sampled $t^{th}$ frame 1840, object data present in the $t^{th}$ frame 1820 is lost during a down sampling process. Thus, even though motion prediction is performed by using the down-sampled $t^{th}$ frame 1840, data of the original object is lost, and thus it is difficult to expect efficient motion prediction.

On the other hand, referring to FIGS. 17A and 17B, in the down-sampled $t^{th}$ frame 1740, an object data loss is relatively small. As such, down sampling is performed by changing a location of a pixel sampled for each frame based on motion information between image frames, thereby minimizing loss of object information present in an original image frame.

Figure 19:
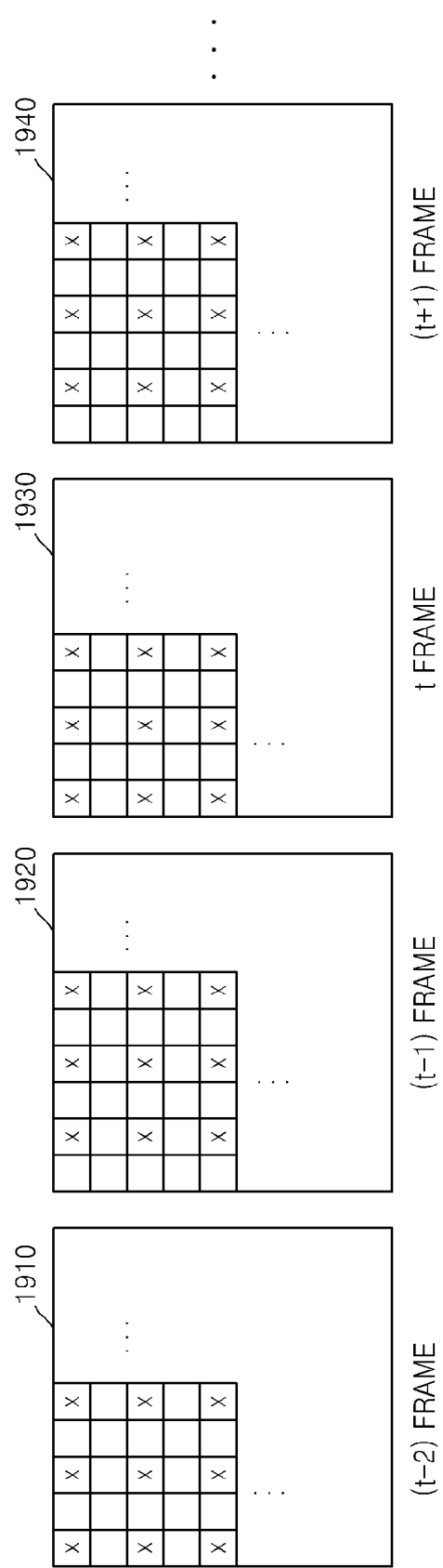
FIG. 19 shows exemplary frames down-sampled by using an adaptive down sampling method, according to another exemplary embodiment.

FIG. 19 shows exemplary frames down-sampled by using an adaptive down sampling method, according to another exemplary embodiment. It is assumed that objects having motions that move by an odd number of pixels in a horizontal direction are present between frames.

In this case, the adaptive down sampler 1410 may determine locations of pixels selected from pixel groups to have a difference of one pixel in the horizontal direction. For example, referring to FIG. 19, the adaptive down sampler 1410 may select a left upper pixel F(2x, 2y, t−2) from pixels F(2x, 2y, t−2), F(2x+1, 2y, t−2), F(2x, 2y+1, t−2), and F(2x+1, 2y+1, t−2) included in a predetermined pixel group of a $(t-2)^{th}$ frame 1910, and generate a down-sampled $(t-2)^{th}$ frame. The adaptive down sampler 1410 may select a right upper pixel F(2x+1, 2y, t−1) from pixels F(2x, 2y, t−1), F(2x+1, 2y, t−1), F(2x, 2y+1, t−1), and F(2x+1, 2y+1, t−1) included in a predetermined pixel group of a $(t-1)^{th}$ frame 1920, and generate a down-sampled $(t-1)^{th}$ frame. The adaptive down sampler 1410 may select a left upper pixel F(2x, 2y, t) from pixels F(2x, 2y, t), F(2x+1, 2y, t), F(2x, 2y+1, t), and F(2x+1, 2y+1, t) included in a predetermined pixel group of a $t^{th}$ frame 1930, and generate a down-sampled $t^{th}$ frame. The adaptive down sampler 1410 may select a right upper pixel F(2x+1, 2y, t+1) from pixels F(2x, 2y, t+1), F(2x+1, 2y, t+1), F(2x, 2y+1, t+1), and F(2x+1, 2y+1, t+1) included in a predetermined pixel group of a $(t+1)^{th}$ frame 1940, and generate a down-sampled $(t+1)^{th}$ frame.

Similarly, when objects having motions that move by an odd number of pixels in a vertical direction are present between frames, the adaptive down sampler 1410 may determine locations of pixels selected from pixel groups to have a difference of one pixel in the vertical direction.

Figure 20:
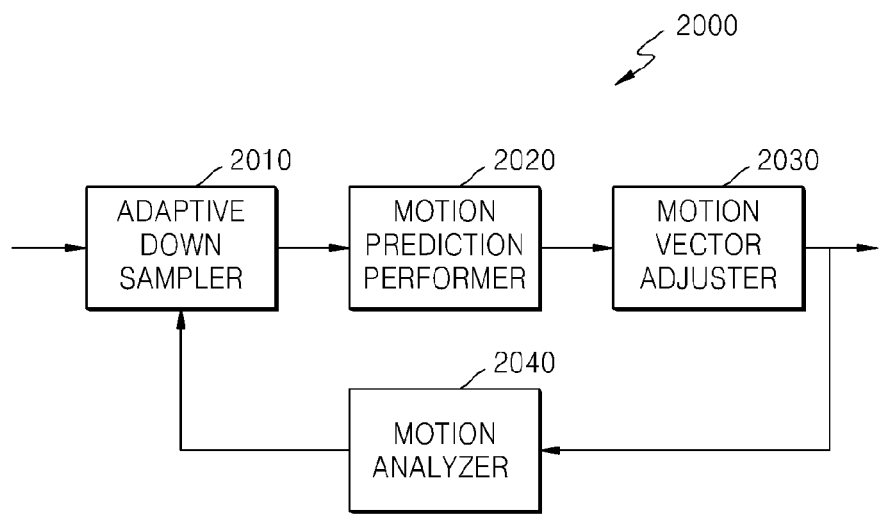
FIG. 20 is a block diagram of a hierarchical motion prediction apparatus, according to another exemplary embodiment.

FIG. 20 is a block diagram of a hierarchical motion prediction apparatus 2000 according to an exemplary embodiment.

Referring to FIG. 20, the hierarchical motion prediction apparatus 2000 includes an adaptive down sampler 2010, a motion prediction performer 2020, a motion vector adjuster 2330, and a motion analyzer 2040.

Operations of the adaptive down sampler 2010 and the motion prediction performer 2020 are the same as those of the adaptive down sampler 1410 and the motion prediction performer 1420 according to the above-described exemplary embodiment, and thus descriptions thereof will not be repeated here.

The motion vector adjuster 2030 corrects a motion vector obtained based on a current frame and a reference frame that are down-sampled by the motion prediction performer 2020 and obtains a more precise motion vector.

The motion analyzer 2040 analyzes a motion vector of a previous frame encoded before each image frame and outputs motion vector information of the analyzed motion vector to the adaptive down sampler 2010. The adaptive down sampler 2010 may determine a location of a pixel that is to be selected from a pixel group of each image frame based on the motion vector information of the previous frame. As described above, the motion vector information of the previous frame may be an average value of motion vectors of blocks included in the previous frame or a global motion vector of the previous frame.

Figure 21:
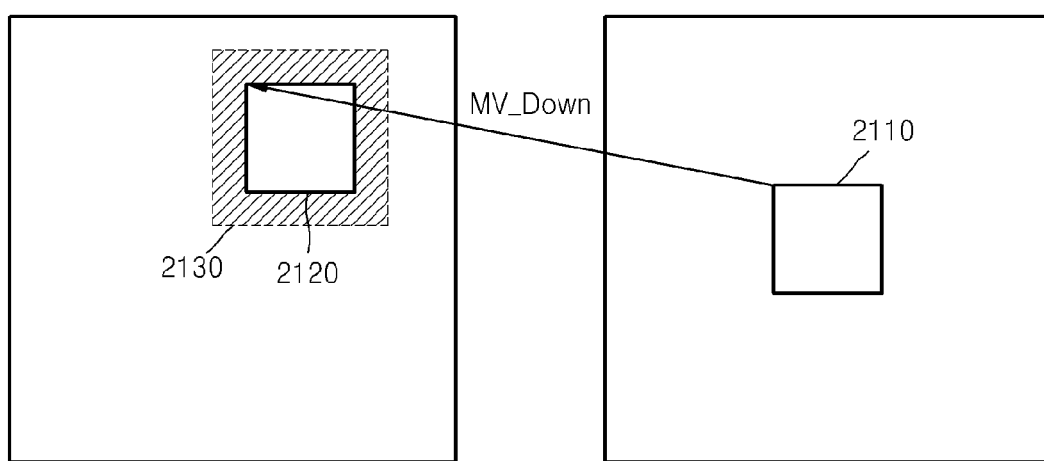
FIG. 21 is a reference view for explaining a process of precisely adjusting a motion vector, which is performed by a motion vector adjuster of the hierarchical motion prediction apparatus of FIG. 20, according to an exemplary embodiment.

FIG. 21 is a reference view for explaining a process of precisely adjusting a motion vector, which is performed by the motion vector adjuster 2030 of the hierarchical motion prediction apparatus 2000, according to an exemplary embodiment.

The motion prediction performer 2020 expands a motion vector of a block obtained from down-sampled frames to be adapted to frames of original resolutions and generates a motion vector of each block with respect to an image frame of the original resolution. That is, when a pixel group includes an m number of pixels (where m is an integer) in a horizontal direction and an n number of pixels (where n is an integer) in a vertical direction, the motion prediction performer 2020 may expand a horizontal axis component of a obtained motion vector by m times, expand a vertical axis component of the obtained motion vector by n times, and generate a motion vector adapted to a frame of an original resolution. A motion vector obtained by using a down-sampled current frame and a down-sampled reference frame has a lower accuracy than that of a motion vector obtained based on a frame of an original resolution. Thus, to correct such accuracy loss, the motion prediction performer 2020 may perform the process of precisely adjusting the determined motion vector.

Referring to FIG. 21, it is assumed that a current frame is a $t^{th}$ frame, and a reference frame is a $(t-1)^{th}$ frame. It is also assumed that a motion vector of a current block 2110 obtained by using frames down-sampled by the motion prediction performer 2020 is MV_Down. The motion vector adjuster 2030 determines a corresponding range that is most similar to the current block 2110 in a search range 2130 expanded by a predetermined number of pixels with respect to a corresponding range 2120 of a $(t-1)^{th}$ frame that the motion vector MV_Down of the current block 2110 indicates. For example, it is assumed that the search range 2130 is a range obtained by expanding the corresponding range 2120 by +1 pixel up, down, right, and left. In this case, a motion vector component in a horizontal axis direction of the motion vector MV_Down and a motion vector component in a vertical axis direction thereof may be changed within a ±1 range through an adjustment process of the motion vector adjuster 2030. A size of the search range 2130 is not limited to the +1 pixel but may be changed. However, the size of the search range 2130 may not be expanded for high speed motion prediction. As described above, when a down-sampled frame has resolution of a 2 pixel unit by selecting a single pixel from a pixel group of 2×2, the search range 2130 may be obtained by expanding the corresponding range 2120 by +1 pixel.

Meanwhile, the operations of the motion vector adjuster 2330 and the motion analyzer 2040 according to another exemplary embodiment may be performed by the motion prediction performer 1420 according to an exemplary embodiment.

Figure 22:
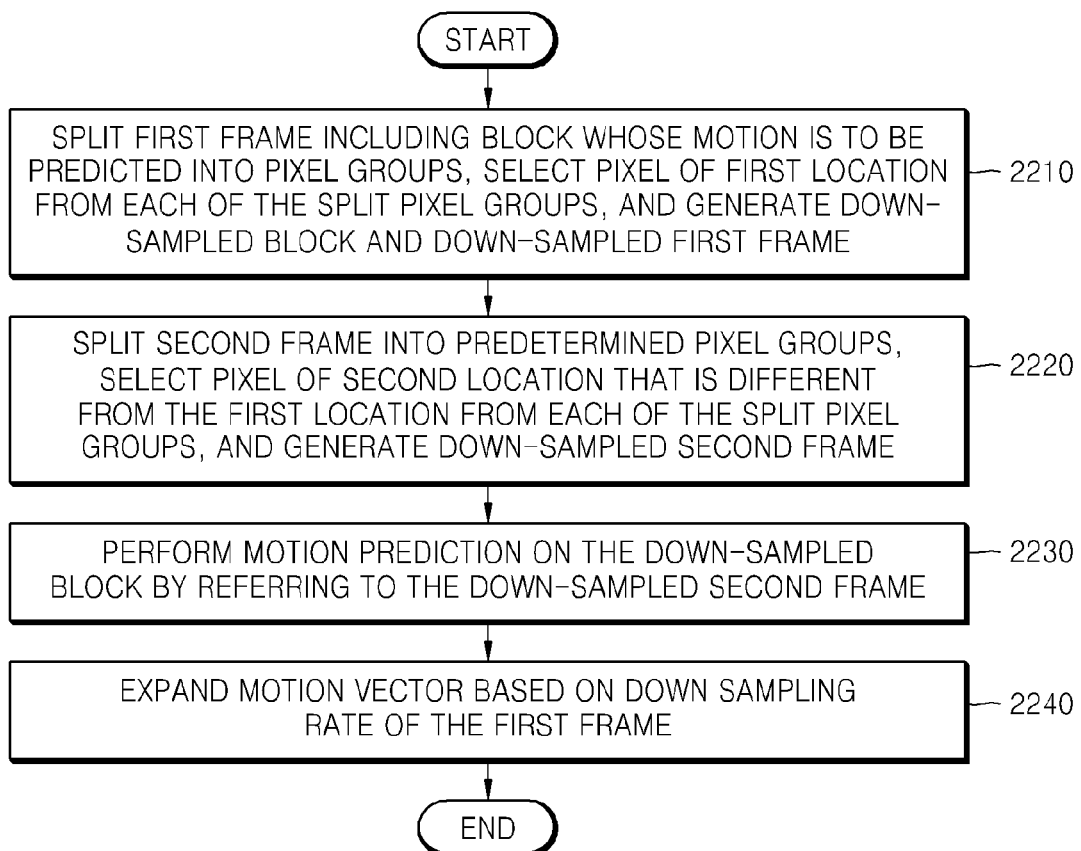
FIG. 22 is a flowchart of a hierarchical motion prediction method, according to an exemplary embodiment.

FIG. 22 is a flowchart of a hierarchical motion prediction method, according to an exemplary embodiment.

Referring to FIGS. 14 and 22, in operation 2210, the adaptive down sampler 1410 splits a first frame including a block that is to be motion-predicted into pixel groups, and generates a down-sampled block and a down-sampled first frame of the block that is to be motion-predicted by selecting a pixel of a first location from each of the split pixel groups.

In operation 2220, the adaptive down sampler 1410 splits a second frame that is encoded and then reconstructed before the first frame into pixel groups for motion prediction of the down-sampled block, and generates a down-sampled second frame by selecting a pixel of a second location that is different from the first location from each of the split pixel groups.

As described above, assuming that a pixel group includes four pixels of a left upper first pixel, a right upper second pixel, a left lower third pixel, and a right lower fourth pixel that are adjacent to each other, and first through fourth pixels included in an optional pixel group of a $t^{th}$ frame are F(2x, 2y,t), F(2x+1, 2y,t), F(2x, 2y+1,t), and F(2x+1, 2y+1,t), respectively, a location of a pixel selected from the pixel group may be changed by varying values of dx(t) and dy(t) in equation 1 described above.

The location of the pixel selected from the pixel group may be previously determined based on a frame order. A location of a pixel selected from a pixel group of each image frame may be determined based on a motion vector of a previously encoded frame. Motion vector information of the previous frame may be an average value of motion vectors of blocks included in the previous frame or a global motion vector of the previous frame.

In operation 2230, the motion prediction performer 1420 performs motion prediction on the down-sampled block by referring to the down-sampled second frame and obtains a motion vector of the down-sampled block.

In operation 2240, the motion prediction performer 1420 expands the motion vector based on a down sampling rate of the first frame. As described above, when a pixel group includes pixels of a size of 2×2 that are adjacent to each other, a down-sampled current frame and a reference frame have resolutions reduced by ½ in horizontal and vertical axes compared to an image frame of an original resolution. In this case, if a motion vector generated by using the down-sampled current frame and reference frame is (mv_x, mv_y), a motion vector of an original image frame is (2*mv_x, 2*mv_y) obtained by doubling the size of the motion vector obtained from the down-sampled frames.

As described above, according to the one or more of the above exemplary embodiments, motion prediction is performed by using a low resolution image frame that is down-sampled from an original image frame, and thus complexity of motion prediction is reduced. Motion prediction is also performed by using low resolution image frames with high correlations between frames, and thus motion prediction efficiency may be improved. That is, according to the one or more of the above exemplary embodiments, even when motion prediction is performed by using an image frame having a resolution lower than that of an original image frame, accuracy of motion prediction is improved, thereby increasing the motion prediction efficiency.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A hierarchical motion prediction method comprising:
splitting a first frame comprising a block that is to be motion-predicted into first pixel groups, and generating a down-sampled block and a down-sampled first frame of the block that is to be motion-predicted by selecting a pixel of a first location from each of the split first pixel groups;
splitting a second frame that is encoded and then reconstructed into second pixel groups for motion prediction of the down-sampled block, and generating a down-sampled second frame by selecting a pixel of a second location that is different from the first location of each of the split first pixel groups;
performing motion prediction on the down-sampled block by referring to the down-sampled second frame and obtaining a motion vector of the down-sampled block; and
expanding the motion vector based on a down sampling rate of the first frame.

2. The hierarchical motion prediction method of claim 1, wherein each of the split pixel groups comprises four pixels of a left upper first pixel, a right upper second pixel, a left lower third pixel, and a right lower fourth pixel that are adjacent to each other,
wherein, in the generating of the down-sampled first frame, a pixel of the first location is selected from the four pixels included in the first pixel groups of the first frame, and
wherein, in the generating of the down-sampled second frame, a pixel of the second location that is different from the first location is selected from the four pixels included in the second pixel groups of the second frame.

3. The hierarchical motion prediction method of claim 1, wherein the first location and the second location are determined based on a motion vector of a previous frame encoded before the first frame and the second frame are encoded.

4. The hierarchical motion prediction method of claim 3, wherein the first location and the second location are determined based on one of an average value of motion vectors of blocks included in the previous frame and whether a horizontal axis direction component and a vertical axis direction component of a global motion vector of the previous frame have odd values.

5. The hierarchical motion prediction method of claim 4, wherein if the horizontal axis direction component has an odd value, the second location is a location moved by one pixel in a horizontal direction from a pixel at the first location, from among the pixels included in each of the split first pixel groups.

6. The hierarchical motion prediction method of claim 4, wherein if the vertical axis direction component has an odd value, the second location is a location moved by one pixel in a vertical direction from a pixel at the first location from among the pixels included in each of the split first pixel groups.

7. The hierarchical motion prediction method of claim 1, wherein the expanding of the motion vector comprises:
when each of the split pixel groups comprises an m number of pixels (where m is an integer) in a horizontal direction and an n number of pixels (where n is an integer) in a vertical direction, expanding a horizontal axis component of the obtained motion vector by m times and expanding a vertical axis component of the obtained motion vector by n times.

8. The hierarchical motion prediction method of claim 1, further comprising:
adjusting the expanded motion vector by determining a corresponding block that is most similar to the block that is to be motion-predicted within a search range corresponding to a region of the second frame indicated by the expanded motion vector.

9. A hierarchical motion prediction apparatus comprising:
an adaptive down sampler configured to split a first frame comprising a block that is to be motion-predicted into first pixel groups, select a pixel of a first location from each of the split first pixel groups, generate a down-sampled block and a down-sampled first frame of the block that is to be motion-predicted, split a second frame that is encoded and then reconstructed into second pixel groups for motion prediction of the down-sampled block, and generate a down-sampled second frame by selecting a pixel of a second location that is different from the first location of each of the split first pixel groups; and
a motion prediction performer configured to perform motion prediction on the down-sampled block by referring to the down-sampled second frame and obtain a motion vector of the down-sampled block and expand the motion vector based on a down sampling rate of the first frame.

10. The hierarchical motion prediction apparatus of claim 9, wherein each of the split pixel groups comprises four pixels of a left upper first pixel, a right upper second pixel, a left lower third pixel, and a right lower fourth pixel that are adjacent to each other,
wherein the adaptive down sampler is further configured to select a pixel of the first location from the four pixels included in the first pixel groups of the first frame, and select a pixel of the second location that is different from the first location from the four pixels included in the second pixel groups of the second frame.

11. The hierarchical motion prediction apparatus of claim 9, wherein the first location and the second location are determined based on a motion vector of a previous frame encoded before the first frame and the second frame are encoded.

12. The hierarchical motion prediction apparatus of claim 11, wherein the first location and the second location are determined based on one of an average value of motion vectors of blocks included in the previous frame and whether a horizontal axis direction component and a vertical axis direction component of a global motion vector of the previous frame have odd values.

13. The hierarchical motion prediction apparatus of claim 12, wherein if the horizontal axis direction component has an odd value, the second location is a location moved by one pixel in a horizontal direction from a pixel of the first location from among the pixels included in each of the split first pixel groups.

14. The hierarchical motion prediction apparatus of claim 12, wherein if the vertical axis direction component has an odd value, the second location is a location moved by one pixel in a vertical direction from a pixel of the first location from among the pixels included in each of the split first pixel groups.

15. The hierarchical motion prediction apparatus of claim 9, wherein when each of the split pixel groups comprises an m number of pixels (where m is an integer) in a horizontal direction and an n number of pixels (where n is an integer) in a vertical direction, the motion prediction performer expands a horizontal axis component of the obtained motion vector by m times and expands a vertical axis component of the obtained motion vector by n times.

16. The hierarchical motion prediction apparatus of claim 9, further comprising: a motion vector adjuster for adjusting the expanded motion vector by determining a corresponding block that is most similar to the block that is to be motion-predicted within a search range corresponding to a region of the second frame indicated by the expanded motion vector.

17. A non-transitory computer-readable recording medium having recorded thereon a computer program for executing the method of claim 1.

18. The hierarchical motion prediction method of claim 1, wherein the splitting the first frame comprises one from among asymmetrical splitting and symmetrical splitting.

19. The hierarchical motion prediction apparatus of claim 9, wherein the splitting the first frame comprises one from among asymmetrical splitting and symmetrical splitting.

20. The hierarchical motion prediction method of claim 1, wherein a process for down-sampling the first frame is different from a process for down-sampling the second frame.

21. The hierarchical motion prediction apparatus of claim 9, wherein the adaptive down sampler implements a first process for down-sampling the first frame that is different from a second process of down-sampling the second frame.

22. The hierarchical motion prediction method of claim 1, wherein the second frame is split before the first frame is encoded.

23. The hierarchical motion prediction apparatus of claim 9, wherein the second frame is split before the first frame is encoded.

* * * * *